United States Patent
Takeuchi et al.

(10) Patent No.: US 10,566,632 B2
(45) Date of Patent: Feb. 18, 2020

(54) HYBRID ELECTROLYTES FOR GROUP 2 CATION-BASED ELECTROCHEMICAL ENERGY STORAGE DEVICE

(71) Applicant: The Research Foundation for the State University of New York, Albany, NY (US)

(72) Inventors: Kenneth J. Takeuchi, South Setauket, NY (US); Esther S. Takeuchi, South Setauket, NY (US); Amy C. Marschilok, Setauket, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 205 days.

(21) Appl. No.: 15/530,261

(22) PCT Filed: Jun. 15, 2015

(86) PCT No.: PCT/US2015/035868
§ 371 (c)(1),
(2) Date: Dec. 16, 2016

(87) PCT Pub. No.: WO2015/195571
PCT Pub. Date: Dec. 23, 2015

(65) Prior Publication Data
US 2017/0250411 A1 Aug. 31, 2017

Related U.S. Application Data

(60) Provisional application No. 62/012,943, filed on Jun. 16, 2014.

(51) Int. Cl.
| | |
|---|---|
| *H01M 6/16* | (2006.01) |
| *H01G 11/60* | (2013.01) |
| *H01G 11/62* | (2013.01) |
| *H01M 10/052* | (2010.01) |
| *H01M 10/054* | (2010.01) |
| *H01M 10/0568* | (2010.01) |
| *H01M 10/0569* | (2010.01) |
| *H01B 1/12* | (2006.01) |
| *H01M 4/46* | (2006.01) |
| *H01M 4/58* | (2010.01) |
| *H01M 10/0566* | (2010.01) |

(52) U.S. Cl.
CPC ............ *H01M 6/166* (2013.01); *H01B 1/122* (2013.01); *H01G 11/60* (2013.01); *H01G 11/62* (2013.01); *H01M 4/46* (2013.01); *H01M 4/58* (2013.01); *H01M 6/162* (2013.01); *H01M 10/052* (2013.01); *H01M 10/054* (2013.01); *H01M 10/0566* (2013.01); *H01M 10/0568* (2013.01); *H01M 10/0569* (2013.01); *H01M 2300/0025* (2013.01); *H01M 2300/0034* (2013.01); *H01M 2300/0091* (2013.01); *Y02E 60/13* (2013.01); *Y02T 10/7011* (2013.01); *Y02T 10/7022* (2013.01)

(58) Field of Classification Search
CPC .... H01M 6/166; H01M 6/162; H01M 10/052; H01M 10/054; H01M 10/0568; H01M 10/0569; H01M 10/0566; H01M 4/46; H01M 4/58; H01M 2300/0034; H01M 2300/0025; H01M 2300/0091; Y02E 60/13; Y02T 10/7022; Y02T 10/7011; H01G 11/60; H01G 11/62; H01B 1/122
See application file for complete search history.

(56) References Cited

U.S. PATENT DOCUMENTS

| | | | |
|---|---|---|---|
| 6,841,300 B2 | 1/2005 | Itaya | |
| 2007/0092803 A1* | 4/2007 | Nakanishi | ......... H01M 10/0567 429/326 |
| 2013/0252112 A1* | 9/2013 | Doe | .................. H01M 10/0568 429/330 |
| 2014/0170507 A1 | 6/2014 | Matsui | |

FOREIGN PATENT DOCUMENTS

WO 2013157187 A1 10/2013

OTHER PUBLICATIONS

Bock, David C., et al., "Batteries used to Power Implantable Biomedical Devices," Electrochim Acta. Dec. 1, 2012; 84:. doi:10.1016/j.electacta.2012.03.057.
Huie, Matthew M., et al., "Ionic liquid hybrids: Progress toward non-corrosive electrolytes with high-voltage oxidation stability for magnesium-ion based batteries," Electrochimica Acta 219 (2016) 267-276, Available online Oct. 1, 2016.
Written Opinion of the International Searching Authority established Aug. 12, 2015 by the USPTO/ISA and dated Sep. 11, 2015 for PCT/US2015/035868.

* cited by examiner

*Primary Examiner* — Laura Weiner
(74) *Attorney, Agent, or Firm* — Sack IP Law p.c.; Alan M. Sack

(57) ABSTRACT

This invention relates to the field of energy storage devices, and especially electrochemical energy storage devices including electrolytes comprising an ionic liquid, one or more solvents, and one or more salts of a Group 2 element. Effects on electrochemical performance of the electrolyte of each of the components of the electrolyte were systematically determined. In addition, interactions between the electrolytes and separator films were dissected to optimize electrochemical performance of coin cell batteries.

43 Claims, 14 Drawing Sheets

HYBRID ELECTROLYTES FOR GROUP 2 CATION-BASED ELECTROCHEMICAL ENERGY STORAGE DEVICE

CROSS-REFERENCE TO OTHER APPLICATIONS

This application claims priority to U.S. Provisional Patent Application No. 62/012,943, filed 16 Jun. 2014, which is incorporated by reference in its entirety.

STATEMENT OF GOVERNMENT RIGHTS

This invention was made with government support under grant number 1275961 awarded by Sandia National Laboratories. The government has certain rights in the invention.

FIELD OF THE INVENTION

This invention relates to the field of energy storage devices, and especially electrochemical energy storage devices. In particular, the invention relates to IUPAC Periodic Table Group 2 cation-based electrolytes for use in electrochemical storage devices. These elements have also been referred to as "Group II" and "Group IIA" in other versions of the periodic table of the elements.

BACKGROUND

Batteries are multi-component systems where the theoretical voltage and stoichiometric electron transfer are defined by the electrochemically active anode and cathode materials. While the electrolyte may not be considered in stoichiometric electron transfer calculations, it can be a critical factor determining the deliverable energy content of a battery, depending also on the use conditions. Development of ionic liquid- (IL-) based electrolytes has been the subject of recent reports by other researchers, due in part to opportunities for expanded high voltage operating window and improved safety through reduction of flammable solvent content.

The need for understanding the contributions to deliverable energy content of batteries has taken on an increased significance due to an ever expanding range of battery applications, including grid level systems and devices involving aerospace, transportation, portable electronics, and biomedical applications (Bock, D. C., et al., "Batteries Used to Power Implantable Biomedical Devices," *Electrochimica Acta*, 84, 155-164 (2012), which is incorporated by reference in its entirety). Along with energy content and power considerations, the safety of batteries under typical use and abuse conditions is a key consideration for practical implementation. Electrolytes and separators are often overlooked when it comes to battery performance because they do not affect the stoichiometric theoretical electron storage capacity of a battery. However, electrolytes and separators can affect charge transport within a battery which ultimately affects deliverable energy content under a specific application.

In addition, reducing the flammability of the battery electrolyte is a sound strategy for increasing the safety of batteries, especially under abuse conditions. Towards this end, ionic liquids (ILs) are being investigated as possible alternatives to conventional electrolytes (Arbizzani, C., et al., "Thermal Stability and Flammability of Electrolytes for Lithium-ion Batteries," *Journal of Power Sources*, 196 (10), 4801-4805 (2011); Komaba, S. et al., "Higher Energy and Safety of Lithium-ion Batteries with Ionic Liquid Electrolyte," *Proceedings of SPIE*, 76830F-76830F (2010); and Nakagawa, H., et al., "Application of Nonflammable Electrolyte with Room Temperature Ionic Liquids (RTILs) for Lithium-ion Cells," *Journal of Power Sources*, 174 (2), 1021-1026 (2007), each of which is incorporated by reference in its entirety).

While ILs have been known for some time, the study of ILs in battery electrolytes is a more recent field of study (Galiński, M., et al., "Ionic liquids as electrolytes," *Electrochimica Acta*, 51 (26), 5567-5580 (2006) and Passerini, S., et al., "Ionic Liquid Based Electrolytes for High Energy Electrochemical Storage Devices," *ECS Transactions*, 1 (14), 67-71 (2006), each of which is incorporated by reference in its entirety). For example, battery studies of neat ILs, as well as mixed solutions, have been conducted to probe the effects of ILs on battery electrochemistry (Choi, J.-A., et al., "Mixed Electrolytes of Organic Solvents and Ionic Liquid for Rechargeable Lithium-Ion Batteries," *Bulletin of Korean Chemical Society*, 31 (11), 3190-3194 (2010); Diaw, M., et al., "Mixed Ionic Liquid as Electrolyte for Lithium Batteries," *Journal of Power Sources*, 146 (1-2), 682-684 (2005); Fu, Y., et al., "Vinyl Ethylene Carbonate as an Additive to Ionic Liquid Electrolyte for Lithium Ion Batteries," *Journal of Applied Electrochemistry*, 39 (12), 2597-2603 (2009); Kraytsberg, A., et al., "Higher, Stronger, Better . . . A Review of 5 Volt Cathode Materials for Advanced Lithium-Ion Batteries," *Advanced Energy Materials*, 2, 922-939 (2012); Kühnel, R. S., et al., "Mixtures of Ionic Liquid and Organic Carbonate as Electrolyte with Improved Safety and Performance for Rechargeable Lithium Batteries," *Electrochimica Acta*, 56 (11), 4092-4099 (2011); Lombardo, L., et al., "Mixtures of Ionic Liquid—Alkylcarbonates as Electrolytes for Safe Lithium-ion Batteries," *Journal of Power Sources*, 227 (0), 8-14 (2013); Moosbauer, D., et al., "Effect of Ionic Liquids as Additives on Lithium Electrolytes: Conductivity, Electrochemical Stability, and Aluminum Corrosion," *Journal of Chemical & Engineering Data*, 55 (5), 1794-1798 (2010); Sato, T., et al., "Ionic Liquids Containing Carbonate Solvent as Electrolytes for Lithium Ion Cells," *Journal of Power Sources*, 138 (1-2), 253-261 (2004); Xu, J., et al., "Additive-containing Ionic Liquid Electrolytes for Secondary Lithium Battery," *Journal of Power Sources*, 160 (1), 621-626 (2006); Fox, E. T., et al., "Physicochemical Properties of Binary Ionic Liquid—Aprotic Solvent Electrolyte Mixtures," *The Journal of Physical Chemistry C*, 117 (1), 78-84 (2012); and Xiang, H. F., et al., "Improving Electrochemical Properties of Room Temperature Ionic Liquid (RTIL) Based Electrolyte for Li-ion Batteries," *Electrochimica Acta* 2010, 55 (18), 5204-5209 (2010), each of which is incorporated by reference in its entirety). ILs are said to be "neat" if no other solvents are added.

Recent reports involving ILs in battery electrolytes include systematic investigations of IL-solvent mixtures, in which the electrochemical stabilities and conductivities of the mixtures were assessed and correlated with physical properties or structural characteristics of the ILs (Di Leo, R. A., et al., "Battery Electrolytes Based on Saturated Ring Ionic Liquids: Physical and Electrochemical Properties," *Electrochimica Acta*, 109, 27-32 (2013) ("Di Leo 2013A") and Di Leo, R. A., et al., "Battery Electrolytes Based on Unsaturated Ring Ionic Liquids: Conductivity and Electrochemical Stability," *Journal of The Electrochemical Society*, 160 (9), A1399-A1405 (2013) ("Di Leo 2013B"), each of which is incorporated by reference in its entirety). In that work, the physical and electrochemical properties of a series of ILs based on imidazolium and pyridinium cations with tetrafluoroborate and bis(trifluoromethanesulfonyl) imide anions neat and mixed with ethylene carbonate or propylene carbonate were reported. Higher conductivities were observed with imidazolium cations, tetrafluoroborate ($BF_4^-$) anions, and shorter chain-length substituents, while lower conductivities were observed with pyridinium cations, bis (trifluoromethanesulfonyl) imide ($TFSI^-$) anions, and longer chain-length substituents. Investigation of ILs based on saturated ring cations, piperidinium and pyrrolidinium, was also conducted and showed further improvement of electrochemical stability.

Investigating physical and electrochemical properties of ILs and IL-based electrolytes in a systematic way provides the insight necessary to tune ILs for various battery applications. Conductivities of electrolytes are often a primary focus of electrolyte studies, because conductivity directly affects charge transport. However, another electrolyte property which is less studied is the ability of an electrolyte to wet the active and inactive surfaces in a battery. Electrolyte wetting properties, as determined by contact angle can be an illustrative measurement to assess electrolyte-electrode and electrolyte-separator compatibility and ultimately fundamental battery electrochemistry properties. Some previous studies of the ability of ILs to wet surfaces have been reported (Restolho, J., et al., "On the Interfacial Behavior of Ionic Liquids: Surface Tensions and Contact Angles," *Journal of Colloid and Interface Science*, 340 (1), 82-86 (2009); Batchelor, T., et al., Wetting Study of Imidazolium Ionic Liquids," *Journal of Colloid and Interface Science*, 330 (2), 415-420 (2009); Restolho, J., et al., "Electrowetting of Ionic Liquids: Contact Angle Saturation and Irreversibility," *The Journal of Physical Chemistry C*, 113 (21), 9321-9327 (2009); Zhang, F.-C., et al., "Morphology and Wettability of [Bmim][PF6] Ionic Liquid on HOPG Substrate," *Chinese Physical Letters*, 27 (8), 086101-1 (2010); Zhang, S., et al., "Enhanced and Reversible Contact Angle Modulation of Ionic Liquids in Oil and Under AC Electric Field," *ChemPhysChem*, 11 (11), 2327-2331 (2010); Carrera, G. a. V. S. M., et al., "Interfacial Properties, Densities, and Contact Angles of Task Specific Ionic Liquids," *Journal of Chemical & Engineering Data*, 55 (2), 609-615 (2009); and Du, B., "Preparation and Characterisation of Self-assembled Monolayers of Long-chain Alkyl Imidazolium-based Ionic Liquids on Glass Surface," *Journal of Chemical Research*, 34 (10), 585-588 (2010), each of which is incorporated by reference in its entirety), however, fewer reports address the contact angle of ILs on substrates relevant to lithium ion batteries (Stefan, C. S., et al., "Are Ionic Liquids Based on Pyrrolidinium Imide Able to Wet Separators and Electrodes Used for Li-ion Batteries?" *Journal of Power Sources*, 189 (2), 1174-1178 (2009), which is incorporated by reference in its entirety).

Ionic liquids continue to hold interest as possible electrolytes for lithium-based batteries. Therefore, characterization of ILs with regard to their conductivity, electrochemical stability, and thermal safety has been pursued (Di Leo 2013A and Di Leo 2013B). Prior reports indicate that saturated cation-based ILs, in particular pyrrolidinium, exhibit high upper voltage limits of stability as well as wide windows of voltage stability (Di Leo 2013A; Di Leo 2013B; Sakaebe, H., et al., "N-Methyl-N-propylpiperidinium Bis (trifluoromethanesulfonyl)imide (PP13-TFSI)—Novel Electrolyte Base for Li Battery," *Electrochemistry Communications*, 5 (7), 594-598 (2003); Monaco, S., et al., "An Electrochemical Study of Oxygen Reduction in Pyrrolidinium-based Ionic Liquids for Lithium/Oxygen Batteries," *Electrochimica Acta*, 83 (0), 94-104 (2012); and Zhou, Q., et al., "Physical and Electrochemical Properties of N-Alkyl-N-methylpyrrolidinium Bis(fluorosulfonyl)imide Ionic Liquids: PY13FSI and PY14FSI," *The Journal of Physical Chemistry B*, 112 (43), 13577-13580 (2008), each of which is incorporated by reference in its entirety). The imidazolium-based ILs demonstrate high conductivities compared to ILs based on other cations.

Most of the recent research and commercial development of electrochemical storage devices has focused on materials that are primarily suitable for use in portable electronics, for vehicle propulsion, and for back-up grid storage, where the amount of energy storage per unit weight or volume (energy density), cost, and stability are typically critical issues. Such electrochemical storage devices primarily rely on the reversible insertion of lithium ions, and typically comprise a metal-oxide cathode, a carbon-based anode, and an electrolyte containing lithium salt. Although these batteries demonstrate high capacity, limited availability of natural lithium may result in prohibitive costs for large-scale energy storage. Due to its reactivity with water, lithium may also pose potential safety hazards.

Lead-acid electrochemical storage devices, which typically comprise lead plates in an electrolyte containing sulfuric acid, are an alternative to lithium ion batteries. Lead-acid electrochemical storage devices are less expensive to produce than lithium ion batteries, but exhibit low energy density, often corrode, and offer the risk of explosion from "gassing"—the accumulation of hydrogen gas when water inside the device is electrolyzed. Additionally, lead-acid electrochemical storage devices contain toxic products, raising environmental and health concerns.

In an effort to increase cost efficiency, Di Leo et al. (Di Leo 2013A and Di Leo 2013B) explored increasing performance, and, ultimately, increasing the cost efficiency, of lithium ion batteries by using various electrolytes. Specifically, Di Leo et al. (Di Leo 2013A and Di Leo 2013B) discussed using ILs containing piperidinium-based, pyrrolidinium-based, imidazolium-based, or pyridinium-based cations in mixtures with conventional carbonates and lithium salts.

The effect of substituent chain length on conductivity and other properties of ILs has been previously assessed (Montanino, M., et al., "The Role of the Cation Aliphatic Side Chain Length in Piperidinium Bis(trifluoromethansulfonyl) imide Ionic Liquids," *Electrochimica Acta*, 57 (0), 153-159 (2011); Fox, E. T., et al., "Tuning Binary Ionic Liquid Mixtures: Linking Alkyl Chain Length to Phase Behavior and Ionic Conductivity," *The Journal of Physical Chemistry C*, 116 (8), 5270-5274 (2012); and Tokuda, H., et al., "Physicochemical Properties and Structures of Room Temperature Ionic Liquids. 1. Variation of Anionic Species," *The Journal of Physical Chemistry B*, 108 (42), 16593-16600 (2004), each of which is incorporated by reference in its entirety).

Generally, these electrolytes display higher electrochemical stability at higher voltages. This greater stability at higher voltages enables the deployment of high energy-density cathodes in lithium ion batteries, previously considered unsuitable for use with conventional electrolytes. However, there remains a need for an electrochemical storage device that is not as costly to produce as lithium-based batteries.

SUMMARY

In view of the above-described challenges, needs, and goals, novel electrolytes that have utility in electrochemical storage devices, such as batteries, are provided. Generally, the disclosed electrolytes utilize salts of Group 2 elements, which are more naturally abundant, and, ultimately, much less costly, than lithium (a Group 1 element).

In some embodiments of the invention, a mixture of an ionic liquid (IL) and a salt of a Group 2 element is described. In some cases this mixture forms a single phase liquid solution. In some embodiments one or more solvents may be added to the mixture or solution.

One aspect of the invention is an electrolyte comprising an IL, one or more solvents, and one or more salts of Group 2 elements. In a preferred embodiment, the IL is piperidinium-based, pyrrolidinium-based, imidazolium-based, or pyridinium-based. In a further preferred embodiment, the salt is a magnesium salt.

In some embodiments, the invention may form an electrolytic composition exhibiting a viscosity of 40 mPa·s to 165 mPa·s. In some embodiments, the ionic liquid and the solvent components of the invention may form a blend that is an electrolyte.

Another aspect of the present invention is an electrochemical storage device comprising the IL-Group 2 salt mixture used as an electrolyte.

In some embodiments of the energy storage device aspect of the invention, the energy storage device may include an electrolyte and a separator, and the contact angle formed by the electrolyte on the separator film may be less than 100°. In some embodiments of the energy storage device aspect of the invention, the energy storage device may include an electrolyte and a separator, and the contact angle formed by the electrolyte on the separator film may be less than 54°.

This, being a summary, is necessarily brief and does not put forth all of the features and advantages of the novel electrolyte system, its methods of making, or its use in energy storage systems. The invention may be more fully understood with reference to the drawings and the detailed description that follow.

BRIEF DESCRIPTION OF THE DRAWINGS

FIG. 5A contains optical images, while FIG. 5B is a three-dimensional bar chart showing the quantitative data obtained.

DETAILED DESCRIPTION

Figure 1A:
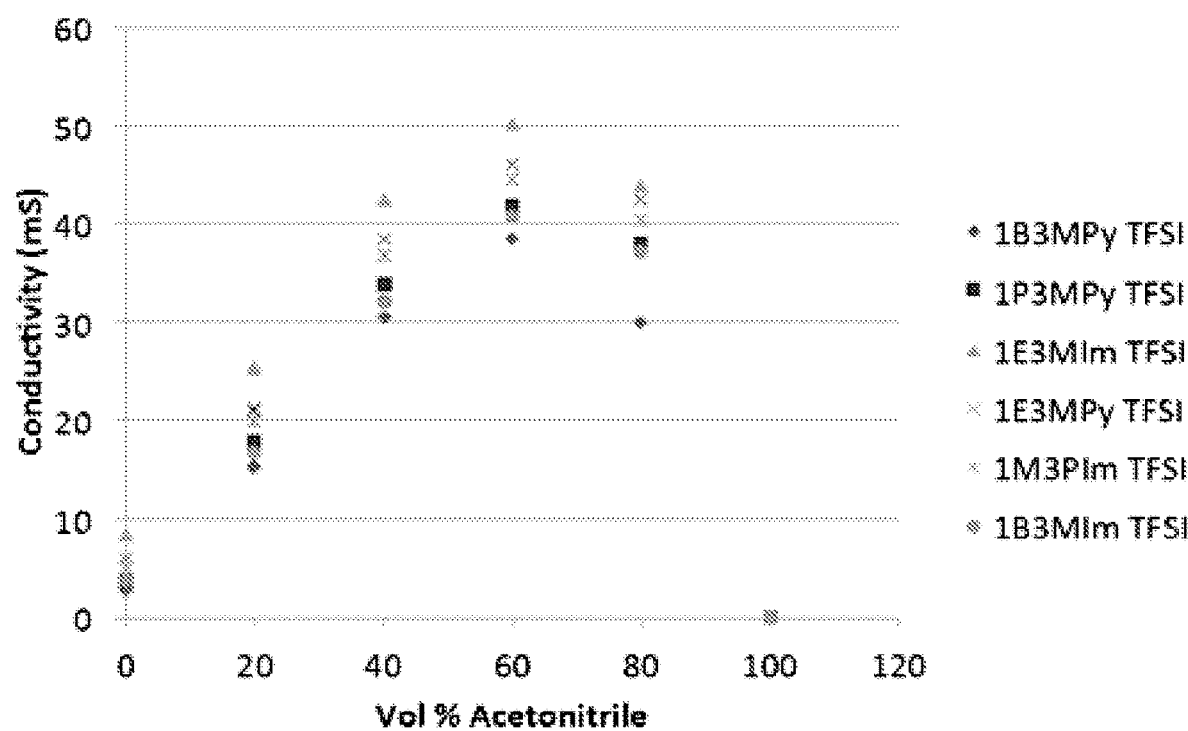
FIGS. 1A and 1B are plots showing the conductivity of ionic liquid-solvent combinations as a function of volume percentage of organic solvent (acetonitrile). Expansion of the legends for FIGS. 1A and 1B may be found in Table 1.

The disclosed invention provides an electrolyte comprising an ionic liquid, one or more solvents, and one or more salts of Group 2 elements.

In one embodiment of the present invention, the electrolyte solvents can be any solvent having Group 2 cation dissociation energies below 600 kJ/mol. Preferably, the solvent is an organic solvent. Preferred solvents include, for example, ethers and nitriles. In a particularly preferred embodiment, the solvent is acetonitrile or propylene glycol dimethyl ether.

The electrolyte salts may be any salt of a Group 2 element, or mixtures of salts of Group 2 elements, that can be used in electrolyte applications. Preferably, the salt is magnesium bis(trifluoromethylsulfonyl)imide (Mg(TFSI)$_2$), magnesium bis(fluorosulfonyl)imide, or magnesium perchlorate (Mg(ClO$_4$)$_2$). The concentration of the salt may vary according to electrolytic application, but is preferably about 0.1 M to 0.5 M, with the most preferred concentration about 0.5 M.

The IL can be any suitable cation/anion combination providing for a room temperature IL suitable for use in electrolyte applications. Considerations to take into account when selecting ILs may include viscosity, conductivity, electrochemical stability, and thermal stability and safety. In a preferred embodiment, the IL is piperidinium-based, pyrrolidinium-based, imidazolium-based, or pyridinium-based. Ionic liquids based on pyrrolidinium and imidazolium cations were selected for many of the examples discussed herein. Piperidinium- and pyridinium-based ILs were also investigated to enable broader comparison of the compositional features important to ILs.

In a particularly preferred embodiment, the IL is selected from a group of imides and tetrafluoroborates including 1-ethyl-3-methylimidazoliumbis(trifluoromethylsulfonyl)imide, 1-methyl-3-propylimidazoliumbis(trifluoromethylsulfonyl)imide, 1-butyl-3-methylimidazoliumbis(trifluoromethylsulfonyl)imide, 1-ethyl-3-methylimidazoliumtetrafluoroborate, 1-methyl-3-propylimidazoliumtetrafluoroborate, 1-butyl-3-methylimidazoliumtetrafluoroborate, 1-ethyl-3-methylpyridiniumbis(trifluoromethylsulfonyl)imide, 1-propyl-3-methylpyridiniumbis(trifluoromethylsulfonyl)imide, 1-butyl-3-methylpyridiniumbis(trifluoromethylsulfonyl)imide, 1-butyl-3-methylpyridiniumtetrafluoroborate, 1-methyl-1-propylpiperidinium-bis(trifluoromethylsulfonyl)imide, 1-butyl-1-methylpiperidinium-bis(trifluoromethylsulfonyl)imide, 1-ethyl-1-methylpyrrolidinium-tetrafluoroborate, 1-methyl-1-propylpyrrolidinium-tetrafluoroborate, 1-butyl-1-methylpyrrolidinium-tetrafluoroborate, 1-ethyl-1-methylpyrrolidinium-bis(trifluoromethylsulfonyl)imide, 1-methyl-1-propylpyrrolidinium-bis(trifluoromethylsulfonyl)imide, and 1-butyl-1-methylpyrrolidinium-bis(trifluoromethylsulfonyl)imide.

Another aspect of the present invention is an electrochemical storage device comprising at least one of the electrolytes of the present invention, an anode, and a cathode.

The anode may comprise any suitable anodic electrode materials compatible with the provided electrolyte. In a preferred embodiment, the anode comprises magnesium-containing materials, which may include magnesium alloys, magnesium intermetallic compounds (magnesium intermetallics), and magnesium metal.

The cathode may comprise any suitable cathodic electrode materials compatible with the provided electrolyte, which may include metal oxides, metal sulfides, metal selenides, and metal phosphates.

The data reported in the following examples is derived from an investigation by contact angle measurements of the wetting properties of ILs and IL-carbonate solvent blends, with and without salt, on battery-relevant substrates, composite electrode surfaces, and separators. The impact of substituent chain length, the cation type, as well as the anion type of the ILs was determined. Further, the influence of adding either propylene carbonate or ethylene carbonate to the IL was studied. Finally, the wetting properties of the electrolytes including lithium-based salts were measured. An inverse trend in conductivity and wetting properties was observed for a series of IL-based electrolyte candidates. Both the electrolyte and the electrolyte-separator interface contribute to cell conductivity; thus although ionic conductivity plays an important role in cell conductivity, without appropriate wetting of the battery components the cell conductivity will be low. Electrochemical test cells containing lithium metal anodes, IL-based hybrid electrolytes, separators, and lithium iron phosphate (LiFePO$_4$) cathodes were used to evaluate electrochemical performance. The influence of IL anion, carbonate co-solvent, and separator type were probed during the experiments using the test cells. The fundamental insight provided by this work may be important for the development of new IL battery based electrolyte systems designed to improve deliverable energy content and safety of lithium ion batteries.

An objective of the experiments described here was to assess the wetting properties of material surfaces contained in batteries by IL-based hybrid electrolytes. As noted, conductivity, electrochemical stability, and lithium ion transference numbers are important for an effective electrolyte. However, the wetting properties of electrolytes should also be considered since the electrochemistry in an energy storage system takes place at a solid surface and batteries contain membranes (separators) which must provide facile ion transport. For these experiments, the wetting properties of four classes of solutions were investigated utilizing contact angle measurements on a variety of battery-relevant substrates. The first group of solutions used neat ILs comprised of a series of cations, (piperidinium, pyrrolidinium, imidazolium, and pyridinium) with variation of organic substituents, and two anions, either tetrafluoroborate (BF$_4^-$) or bis(trifluoromethanesulfonyl) imide (TFSI$^-$). ILs are said to be "neat" if no other solvents are added. Abbreviations and general structures for each of the ILs are provided for clarity in Table 1. The second group of solutions incorporated blends of ILs with carbonate solvents, specifically ethylene carbonate (EC) or propylene carbonate (PC). The third group of solutions included ILs and dissolved electrolyte salts, either lithium tetrafluoroborate (LiBF$_4$) or lithium bis(trifluoromethanesulfonyl) imide (LiTFSI). The fourth group contained ILs, carbonate solvents, and dissolved electrolyte salts.

TABLE 1

Ionic liquid names, abbreviations, and structures.

| Full Name | Abbreviation |
|---|---|
| 1-methyl-1-propylpiperidinium-bis(trifluoromethylsulfonyl)imide | 1M1PPi-TFSI |
| 1-butyl-1-methylpiperidinium-bis(trifluoromethylsulfonyl)imide | 1B1MPi-TFSI |
| 1-ethyl-1-methylpyrrolidinium-tetrafluoroborate | 1E1MPyrr-BF4 |
| 1-methyl-1-propylpyrrolidinium-tetrafluoroborate | 1M1PPyrr-BF4 |
| 1-butyl-1-methylpyrrolidinium-tetrafluoroborate | 1B1MPyrr-BF4 |
| 1-ethyl-1-methylpyrrolidinium-bis(trifluoromethylsulfonyl)imide | 1E1MPyrr-TFSI |
| 1-methyl-1-propylpyrrolidinium-bis(trifluoromethylsulfonyl)imide | 1M1PPyrr-TFSI |
| 1-butyl-1-methylpyrrolidinium-bis(trifluoromethylsulfonyl)imide | 1B1MPyrr-TFSI |
| 1-ethyl-3-methylimidazoliumbis(trifluoromethylsulfonyl)imide | 1E3MIm-TFSI |
| 1-methyl-3-propylimidazoliumbis(trifluoromethylsulfonyl)imide | 1M3PIm-TFSI |
| 1-butyl-3-methylimidazoliumbis(trifluoromethylsulfonyl)imide | 1B3MIm-TFSI |
| 1-ethyl-3-methylimidazoliumtetrafluoroborate | 1E3MIm-BF4 |
| 1-methyl-3-propylimidazoliumtetrafluoroborate | 1M3PIm-BF4 |
| 1-butyl-3-methylimidazoliumtetrafluoroborate | 1B3MIm-BF4 |
| 1-ethyl-3-methylpyridiniumbis(trifluoromethylsulfonyl)imide | 1E3MPy-TFSI |
| 1-propyl-3-methylpyridiniumbis(trifluoromethylsulfonyl)imide | 1P3MPy-TFSI |
| 1-butyl-3-methylpyridiniumbis(trifluoromethylsulfonyl)imide | 1B3MPy-TFSI |
| 1-butyl-3-methylpyridiniumtetrafluoroborate | 1B3MPy-TFSI |

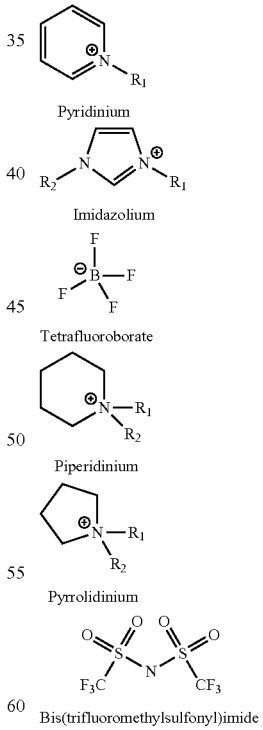

Pyridinium

Imidazolium

Tetrafluoroborate

Piperidinium

Pyrrolidinium

Bis(trifluoromethylsulfonyl)imide

The examples disclosed here encompass a systematic investigation of the physical properties of IL-based hybrid electrolytes including quantitative characterization of the electrolyte-separator interface via contact angle measurements. An inverse trend in conductivity and wetting properties was observed for a series of IL-based electrolyte candidates. Test cell measurements were undertaken to evaluate electrolyte performance in the presence of functioning anode and cathode materials, and several promising IL-based hybrid electrolytes with performance comparable to that of conventional carbonate electrolytes were identified. This work revealed that the contact angle influenced performance more significantly than did conductivity, as the cells containing IL-tetrafluoroborate based electrolytes with higher conductivity but poorer wetting showed significantly decreased performance relative to cells containing IL-bis (trifluoromethanesulfonyl) imide electrolytes with lower conductivity but improved wetting properties. This foundation may contribute to the development of new IL battery based electrolyte systems with the potential to improve deliverable energy content as well as safety of lithium ion battery systems.

EXAMPLES

The examples set forth below also serve to provide further appreciation of the disclosed embodiments of the invention, but are not meant in any way to restrict the scope of the invention.

I. Experimental Protocol

The ILs used for these experiments were purchased from Iolitec Inc. (Tuscaloosa, Ala.) and were dried under vacuum prior to use. The water content of the ILs after drying was measured using Karl Fisher titration (coulometry) and found to be below 50 ppm with an average of 25 ppm. After drying, the ILs and electrolytes were prepared in a glove box under an inert atmosphere. Contact angle measurements were carried out using a Kyowa DropMaster DM-501 series instrument (Kyowa Interface Science Co., Ltd., Japan), using the sessile drop method. Values were averaged over six measurements for a given solution on a substrate. Commercially obtained samples of separator, polyethylene (Tonen E25, Toray Battery Separator Film Co, Ltd., Japan), tri-layer polypropylene/polyethylene/polypropylene (Celgard 2325, Celgard, LLC., Charlotte, N.C.), and polypropylene (Celgard 2500, Celgard, LLC.), were evaluated as substrates.

II. Preparation of Composite Electrodes

Composite electrodes were prepared in house by coating mixtures onto aluminum foil. The mixtures consisted of active materials: $LiFePO_4$ (MTI Corporation, Richmond, Calif.) or $Li_4Ti_5O_{12}$ (MTI Corporation), carbon, and polyvinylidene fluoride. Viscosity measurements were taken at 23° C. with a Brookfield LVT viscometer (Brookfield Engineering Laboratories, Middleboro, Mass.) with a cone/plate attachment. Contact angle and viscosity measurements were completed in a dry room with a dew point of −45° C. to minimize water uptake during measurement.

III. Construction of Electrochemical Test Cells

Electrochemical test cells were constructed with lithium iron phosphate ($LiFePO_4$) electrodes opposite lithium metal anodes, using IL hybrid electrolytes as described in this Example. Control cells utilized solvents based on ethylene carbonate (EC) and dimethyl carbonate (DMC) with lithium tetrafluoroborate, lithium hexafluorophosphate, or lithium bis(trifluoromethanesulfonyl) imide salts. Cells were cycled between 4.2 V and 2.0 V versus lithium at ~10 mA/g.

Figure 1B:
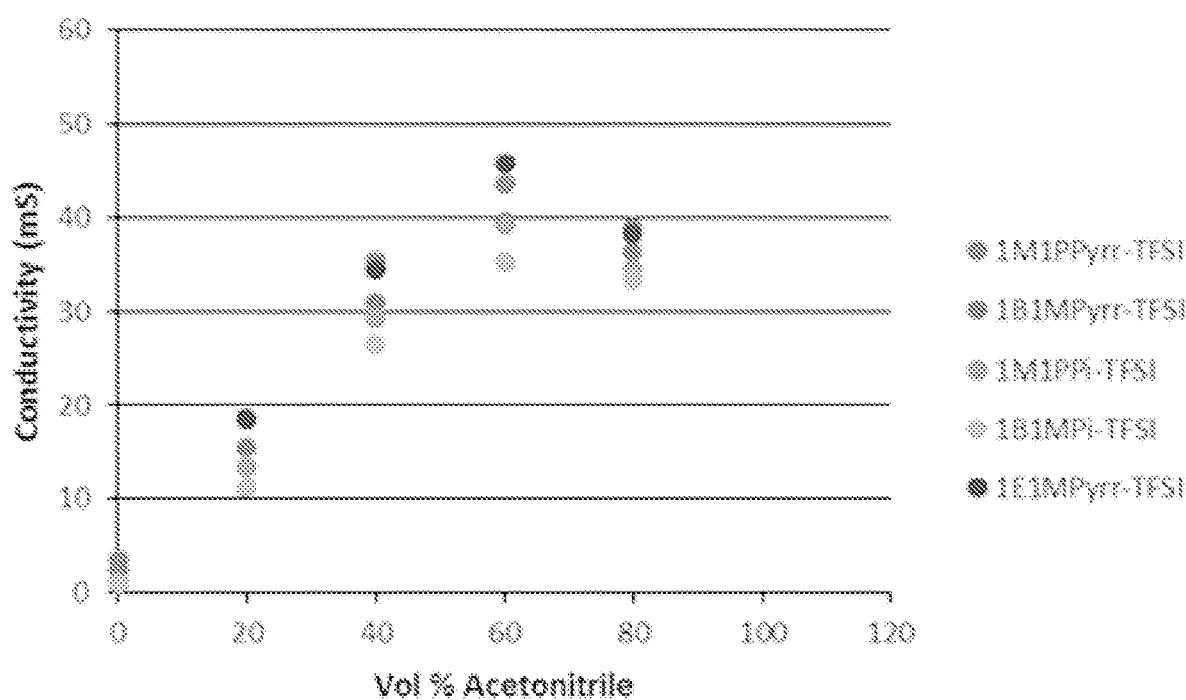
Figure 2A:
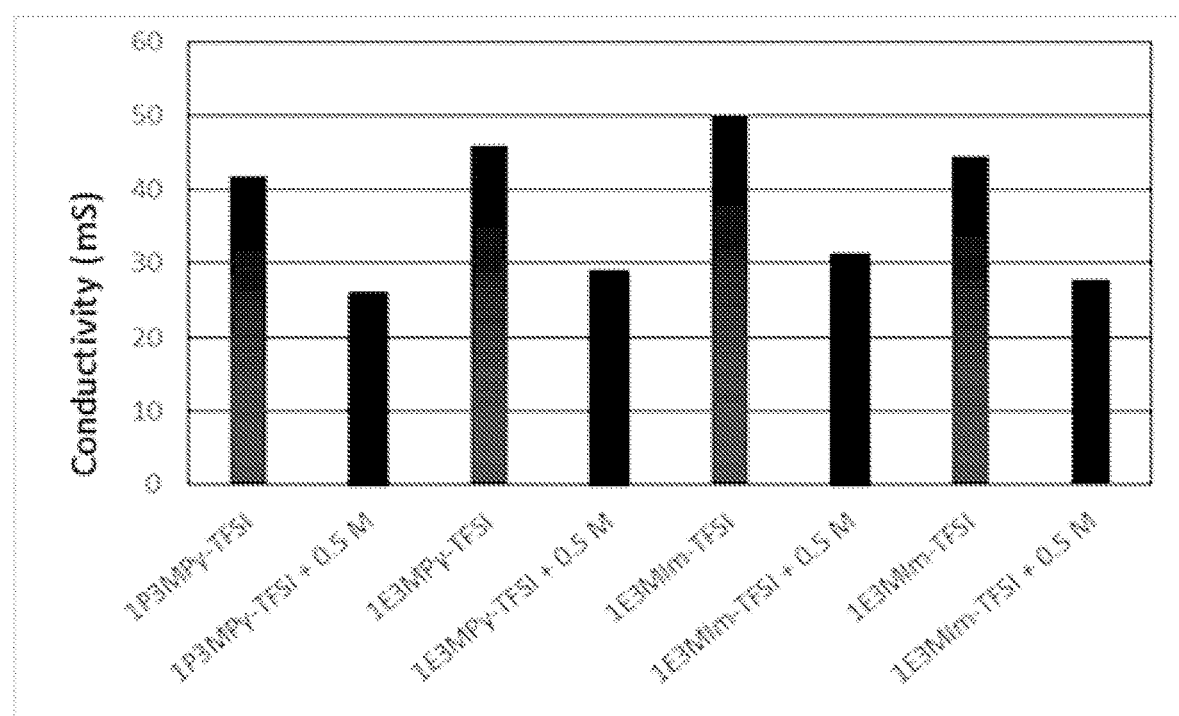
FIGS. 2A and 2B are bar graphs showing the conductivity of ionic liquid-solvent combinations and hybrid electrolytes containing Group 2 cation-based salt. Expansion of the legends for FIGS. 2A and 2B may be found in Table 1.
Figure 2B:
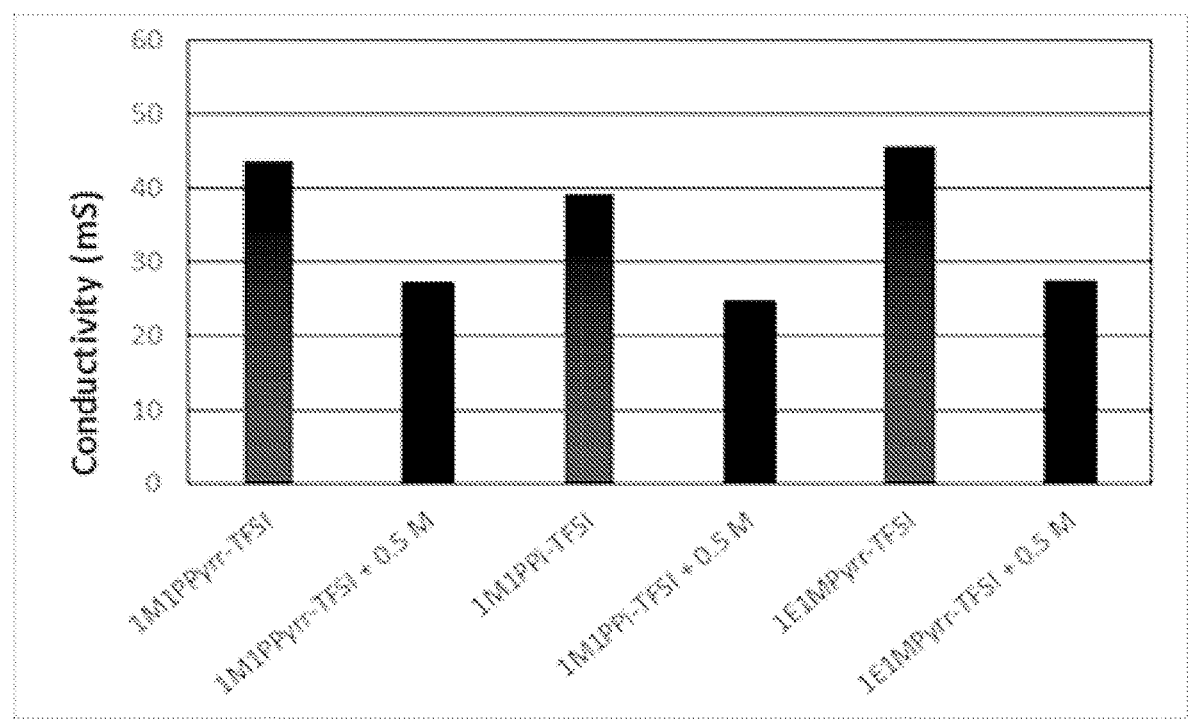

Ionic liquids were mixed with acetonitrile (solvent) to determine the conductivity as a function of IL percentage by volume. The conductivities of the IL-solvent combinations were measured at fixed increments from 100% to 0% IL. The conductivity as a function of acetonitrile concentration for select salts is shown in FIGS. 1A and 1B. For all combinations shown the highest conductivities were obtained for volumetric ratios of solvent to IL of 40% to 80%, tailing off on either side. For select mixtures, the IL-solvent combinations were mixed with 0.5 M Group 2 cation-based salt ($Mg(TFSI)_2$) to prepare hybrid electrolytes. Conductivities of the solutions of IL-solvent combinations and the hybrid electrolytes were measured using an Oakton CON 11 series conductivity probe (Cole-Parmer Instrument Company, LLC, Vernon Hills, Ill.) at ambient temperature (20° C. to 27° C.). The results are shown in FIGS. 2A and 2B.

IV. Measurements of Stability

Figure 3:
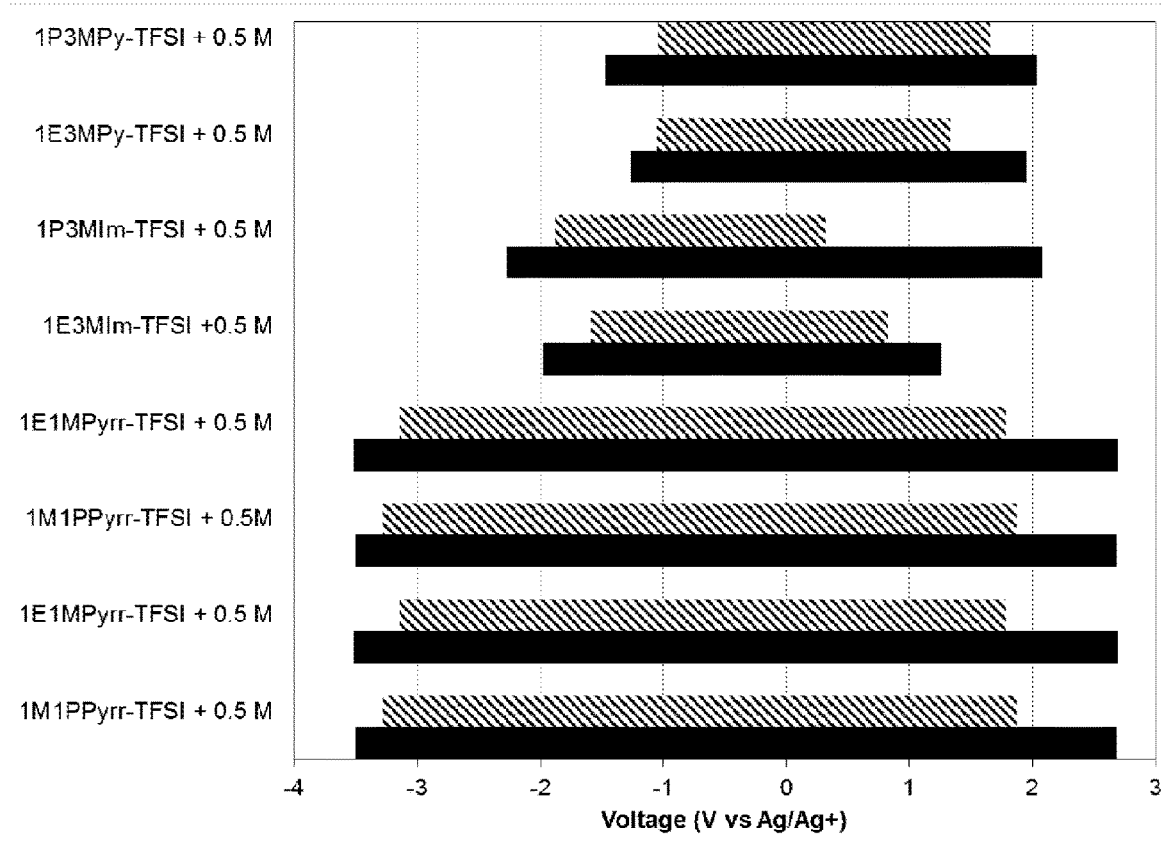
FIG. 3 is a chart showing voltage windows of stability for hybrid electrolytes containing Group 2 cation-based salt at current densities of 0.1 mA/cm$^2$ (solid bars) and 0.01 mA/cm$^2$ (dashed bars).

Cyclic voltammetry (CV) was used to probe reduction-oxidation reactions where irreversibility or exceedingly large currents can suggest decomposition. CV was performed using a glassy carbon working electrode with a platinum metal counter electrode and a silver/silver ion ($Ag/Ag^+$) reference electrode. Scans were completed using a CH Instruments (Bee Cave, Tex.) potentiostat at 20 mV/s by incrementally broadening the voltage window under successive scans. Baselines were established for each CV curve and the limiting currents were used to identify stable voltages. Current densities of 0.1 $mA/cm^2$ and 0.01 $mA/cm^2$ were used to determine the windows of stability. The windows of stability with respect to voltage for hybrid electrolytes containing Group 2 cation-based salts are shown in FIG. 3, where the solid bars show the stability windows at a current density of 0.1 $mA/cm^2$ and the dashed bars show the window at a current density of 0.01 $mA/cm^2$.

Example 1 Neat Ionic Liquids

Figure 4A:
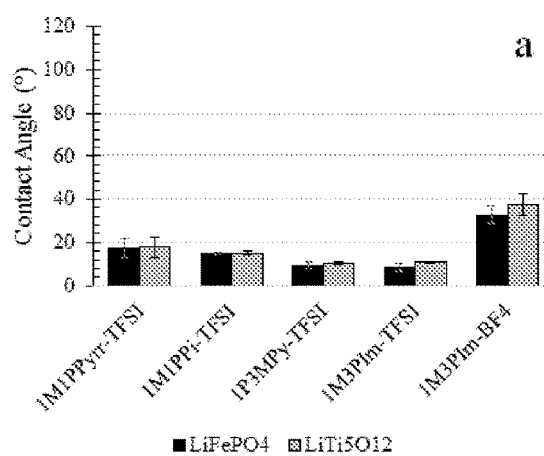
FIGS. 4A and 4B are bar charts showing contact angle measurements of ionic liquid on various electrode (4A) and separator (4B) substrates.
Figure 4B:
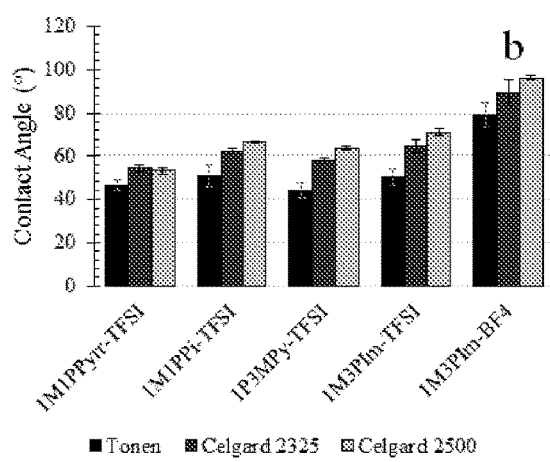

The impact of the substituent chain length, the cation type, as well as the anion type of the neat ILs was examined using a series of substrates. Three separator types (Tonen, Celgard 2325, and Celgard 2500) and composite electrodes with either $LiFePO_4$ or $Li_4Ti_5O_{12}$ were tested. In all cases, the contact angles for the aluminum foil, PVDF-coated copper foil, and $Li_4Ti_5O_{12}$ or $LiFePO_4$ composite electrodes, FIG. 4A, were notably lower than the values measured for the separator materials, FIG. 4B. For example, the contact angles for wetting by 1M1PPyrr-TFSI determined for $LiFePO_4$ and $Li_4Ti_5O_{12}$ electrodes were 17.7° and 17.2°, while the separator contact angle values ranged from 46.4° to 53.0°. Similar results were obtained using 183MIm-TFSI (or 183MIm-$BF_4$) where the contact angles for $LiFePO_4$ and $Li_4Ti_5O_{12}$ electrodes were 11.9° and 14.8° (22.9° and 29.2°), while the separator contact angle values ranged from 48.9° to 53.7° (75.9° to 85.9°). Therefore, for the bulk of the experiments, the contact angle measurements focused on the use of separators as substrates as they showed the largest values and most significant variation in contact angle. Error bars in FIGS. 4A and 4B represent one standard deviation of six measurements for each IL-and-surface combination.

The effect of the cation in ILs on conductivity had been studied (Di Leo 2013B). This work extended that by investigating the effects of the cation on contact angle measurements. The contact angle values comparing the pyrrolidinium, piperidinium, imidazolium, and pyridinium cations with $TFSI^-$ anion across three different separator materials were determined (FIG. 4B). Specifically, commercially obtained samples of Tonen E25—polyethylene, Celgard 2325—tri-layer polypropylene/polyethylene/polypropylene, and Celgard 2500—polypropylene, were used for the experiments. Some trends in the separator material are apparent from the data; all the ILs have the smallest contact angle with Tonen (polyethylene), followed by Celgard 2325

(polyethylene-polypropylene layered material), with Celgard 2500 (polypropylene) showing the highest contact angle values. The effect of the cation can be categorized by size and by the saturated versus unsaturated nature of the ring. For the unsaturated cations (pyridinium and imidazolium) the larger, 6-membered ring pyridinium-based IL showed smaller contact angles than its 5-membered ring counterpart, imidazolium, across all three separator types. However, for the saturated-ring ILs (pyrrolidinium and piperidinium), the smaller 5-membered ring pyrrolidinium-based IL had smaller contact angles across the three separator types compared to its piperidinium (6-membered ring) counterpart. This suggests there are competing factors of size and saturation level affecting the wettability of the separators by ILs.

Figure 5A:
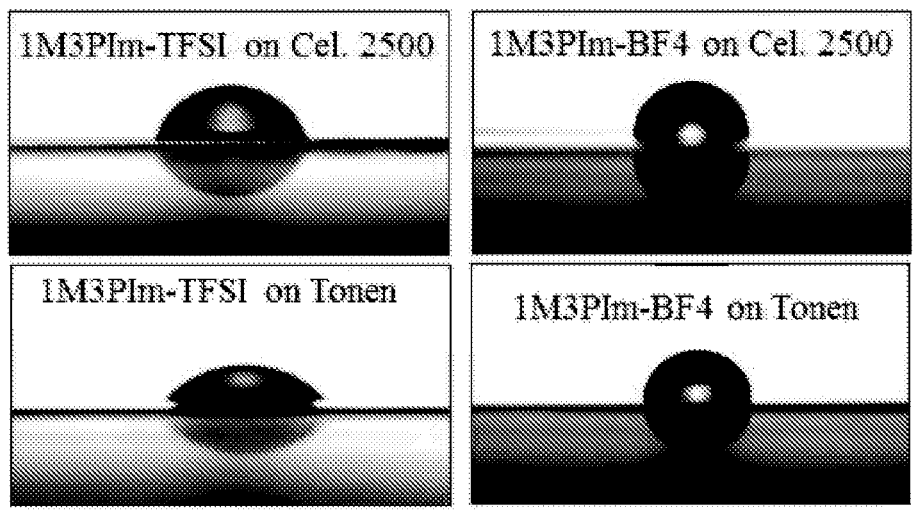
FIGS. 5A and 5B show the contact angle as a function of ionic liquid and separator type.
Figure 5B:
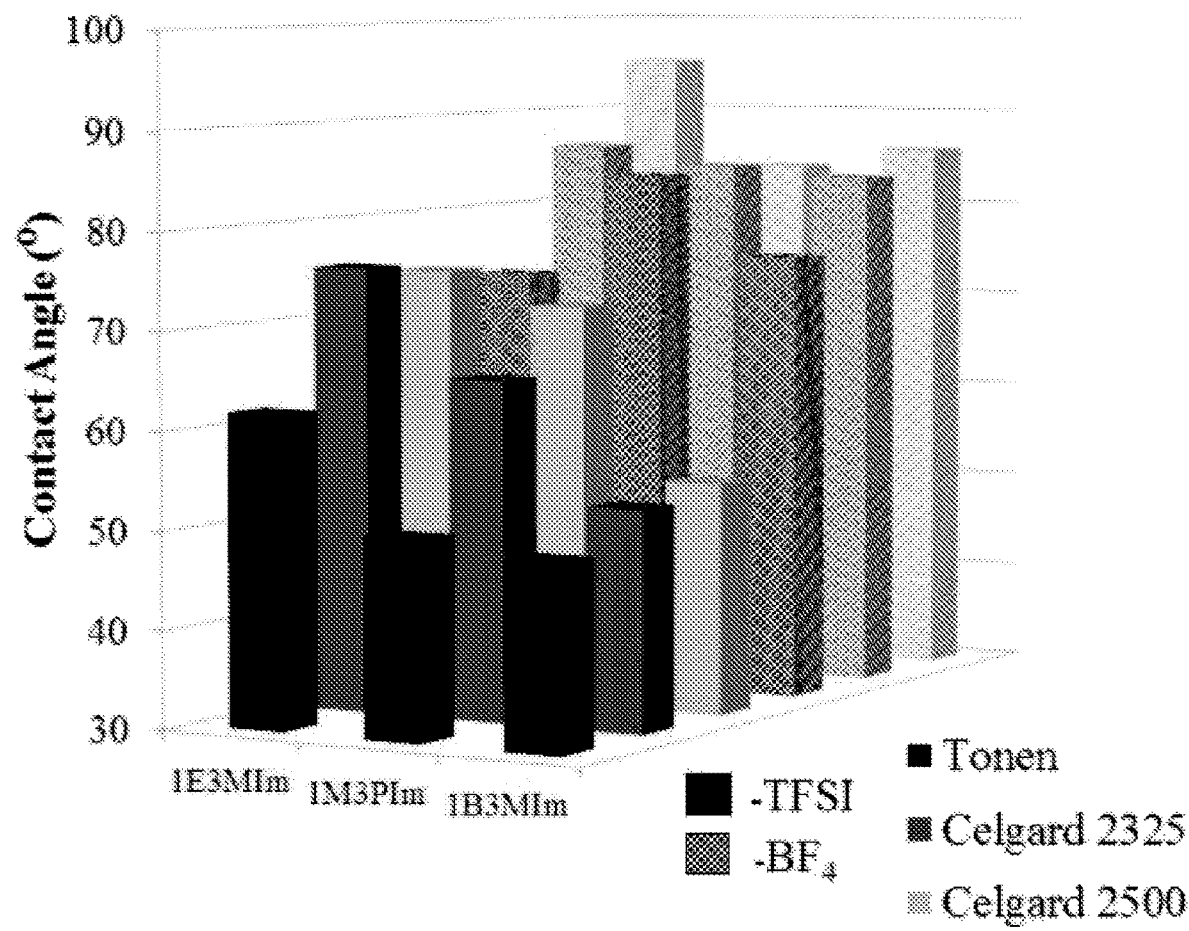

In line with investigating the effect of substituent chain length on conductivity and other properties of ILs, FIGS. 5A and 5B show the contact angle on the three separator types for a series of imidazolium-based ILs with substituent chain lengths ethyl-, propyl-, and butyl-, having both $BF_4^-$ and $TFSI^-$ anions. The photographs in FIG. 5A show the droplet configuration of two solutions on two of the separators, Celgard 2500 and Tonen. From such photographs the contact angle of the solution with the separator could be measured. In FIG. 5B, solid bars represent results for $TFSI^-$ anion and hatched bars represent those for $BF_4^-$ anion. For the Im-TFSI series on Tonen separator, the ethyl-substituent shows a contact angle of approximately 63°, with the propyl- and butyl-substituents showing lower values near 50.5° and 49°, respectively. Representative optical micrographs are shown in FIG. 5A. For the Tonen substrate, the contact angle trends to lower values with longer chain length. This trend is consistent with other work which studied different ILs (Batchelor, Du, and Stefan). In this series, the property of longer length of the substituent aids in wetting the separator by adding to the hydrophobic nature of the IL (Huddleston, J. G., et al., "Characterization and Comparison of Hydrophilic and Hydrophobic Room Temperature Ionic Liquids Incorporating the Imidazolium Cation," *Green Chemistry*, 3 (4), 156-164 (2001), which is incorporated by reference in its entirety), making it more compatible with the hydrophobic separator membranes used as the substrates for these experiments. The role of the anion of the IL can be seen in FIGS. 5A and 5B as well. On Tonen, the $BF_4^-$ anion-based ILs with ethyl-, propyl-, and butyl-chain lengths have contact angles of 73°, 84°, and 76°, respectively, all higher than their $TFSI^-$ counterparts (FIG. 5B). The contact angles for the two anions for three different chain-length ILs all show the trend that for the imidazolium cation, the ILs with the $TFSI^-$ anions have lower contact angles than those with the $BF_4^-$ anions, suggesting they are better able to wet separators when compared to $BF_4^-$. The anion size does significantly influence the hydrophobic nature of the IL, with larger ions showing increased hydrophobic properties, which in this case led to improved separator wetting. The Celgard substrates show generally higher contact angles across the series, with similar values between the Celgard 2325 and 2500 separators in each case (Huddleston).

Figure 6:
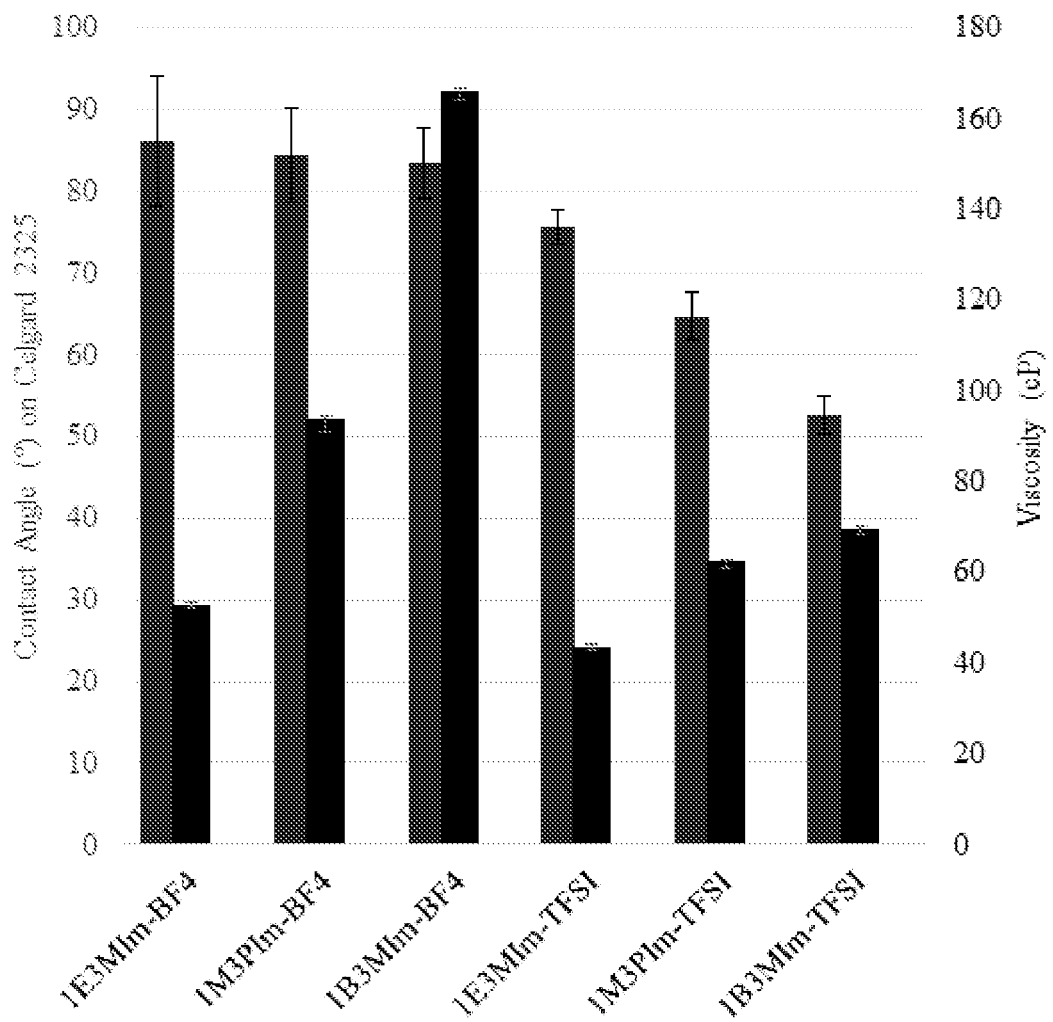
FIG. 6 is a composite bar chart showing the contact angle and viscosity as functions of ionic liquid cation substituent and anion type.

In order to probe further the behavior of the ILs, viscosity measurements of the ILs were taken. The influence of both anion type and substituent chain length on contact angle are considered in relation to the viscosity of the IL (FIG. 6). Contact angle error bars represent one standard deviation for six measurements of each IL on Celgard 2325 separators. Viscosity error bars represent one standard deviation for six measurements of each IL. These data suggest some interesting trends in the behavior of the ILs. First, viscosity values increase with increase of substituent chain length across both anion types. Previous studies observed the same trend that longer alkyl chain lengths on the cation increase the viscosity of the IL (Huddleston; Seddon, K. R., et al., "Influence of Chloride, Water, and Organic Solvents on the Physical Properties of Ionic Liquids," *Pure and Applied Chemistry*, 72 (12), 2275-2287 (2000); and Marsh, K. N., et al., "Room Temperature Ionic Liquids and their Mixtures—a Review," *Fluid Phase Equilibria*, 219 (1) 93-98 (2004), each of which is incorporated by reference in its entirety). The viscosity of the $BF_4^-$ based ILs scale from 52.8 cP (mPa·s) to 93.6 cP to 166.1 cP from ethyl- to propyl- to butyl-chain length, while those for the $TFSI^-$ based ILs increase from 43.5 cP to 62.1 cP to 69.4 cP, as seen in FIG. 6. These data affirm higher viscosity values for the $BF_4^-$ based ILs and imply that for the smaller anion, more ordering of the IL contributes to higher viscosity. In addition to the viscosity trends, there is also a trend in contact angle values with chain length: longer chain lengths have lower contact angles. This is very clear in the $TFSI^-$ series in which the ILs have contact angles of 75.6°, 64.7°, and 52.6° for the ethyl-, propyl-, and butyl-substituents, respectively. There may also be a trend in contact angle for the $BF_4^-$-based ILs, but the changes with substituent chain length are much less apparent. Notably the contact angles for the $BF_4^-$ based ILs are also significantly larger than the $TFSI^-$ based ILs, ranging from 83.5° to 86.2°. For the measurements shown on the substrates involved in these experiments, the observed trends suggest that while longer chain lengths give rise to higher and thus less desirable viscosity values, they show the opposite behavior in wettability as determined by contact angle measurements where longer substituents lead to improved wetting of hydrophobic surfaces such as separator membranes.

Example 2 Ionic Liquids and Carbonate Solvents

Previous studies have reported the reduction of the high viscosity values and accompanying increase in conductivity of neat ILs by mixing with other solvents, in many cases carbonates (Diaw; Di Leo 2013B; and Chagnes, A., et al., "Imidazolium-organic Solvent Mixtures as Electrolytes for Lithium Batteries," *Journal of Power Sources*, 145 (1) 82-88 (2005), which is incorporated by reference in its entirety). In this work, and in previous work by this group, the effect of mixing ILs with carbonate solvents was studied. The effect of ethylene carbonate (EC) or propylene carbonate (PC) in 1:1 v/v mixtures with ILs on contact angle was studied. The contact angles of the IL/solvent mixtures were taken on Tonen and Celgard 2500 separator materials as substrates. Specifically, the contact angles of 1M3PIm-$BF_4$, 1M3PIm-TFSI, and 1M1PPyrr-TFSI neat and mixed with EC or PC were determined. When measured on Tonen, the IL 1M3PIm-$BF_4$ (an unsaturated cation and $BF_4^-$ anion) has a rather high contact angle of 84°, while the addition of PC or EC lowers it to 73°. When measured on Celgard 2500, the pure IL 1M3PIm-$BF_4$ had the same high contact angle of 84°, while PC lowered the contact angle relative to the pure IL (75°), but the addition of EC did not (96°). For 1M3PIm-TFSI on Celgard 2500, the contact angle measurements were lower (71°) than for 1M3PIm-$BF_{4)}$(84°. However, for 1M3PIm-TFSI the addition of PC lowered the contact angle on Celgard 2500 (58°) while EC did not (78°). In comparison, neat IL 1M1PPyrr-TFSI (a saturated cation and $TFSI^-$ anion) has a low contact angle of 46° on Tonen. The addition of PC results in no change in contact angle with a value of 47° while the addition of EC slightly increases the value to 54° on Tonen separator. On Celgard 2500, neat IL 1M1PPyrr-TFSI has a low contact angle of 53°, while the addition of PC or EC results in an increase in contact angle (70° and 73°, respectively). These results indicate that the addition of EC or PC to an imidazolium $BF_4^-$-based IL may slightly improve the wettability of a hydrophobic separator membrane. This is consistent with the higher ordering of the $BF_4^-$-based ILs as reflected by higher viscosity values of $BF_4^-$-based ILs compared to their $TFSI^-$-based counterpart ILs (Di Leo 2013B). In the case of TFSI-based ILs, there is no significant improvement in contact angle resulting from addition of EC or PC.

Example 3 Ionic Liquids and Lithium Salts

Figure 7:
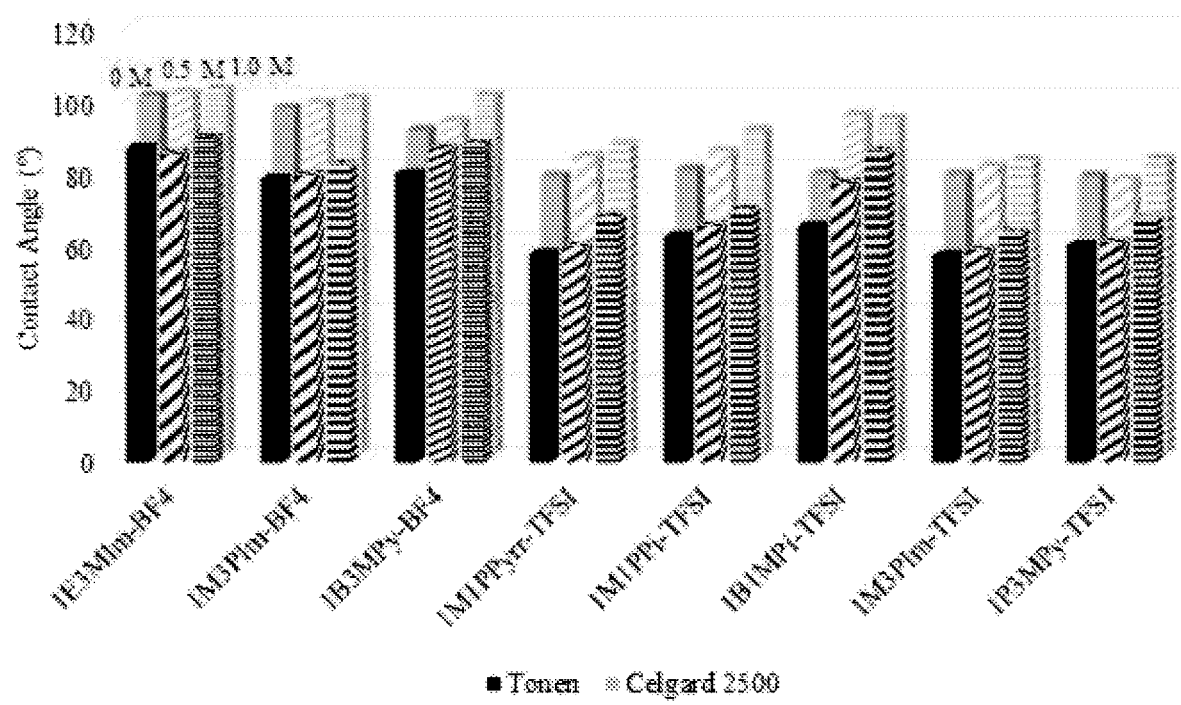
FIG. 7 is a three-dimensional bar chart showing the contact angle on Tonen and Celgard 2500 separators for ILs with varying salt content.

It is of interest to consider the impact of added salt as a lithium-based salt could be used for the formulation of a battery electrolyte. A lithium salt in which the anion matched the anion of the IL, either LiTFSI or $LiBF_4$, was added. The contact angle and conductivity was determined for neat IL and for 0.5 M and 1.0 M concentrations of lithium salt in IL. FIG. 7 shows the contact angles for these lithium salt-IL solutions with 0 M salt, 0.5 M salt, and 1 M salt in various ILs. For each IL there is a general trend of increasing contact angle with increasing lithium salt concentration. Also, contact angles measured on Celgard 2500 separators are consistently larger than the measurements on Tonen separators. Most notable is the separation of the data based on anion type. Samples with $BF_4^-$ anions consistently have higher contact angle than samples with $TFSI^-$ anions. This relationship is illustrated by fixing the cation and comparing 1M3PIm-$BF_4$ to 1M3PIm-TFSI. 1M3PIm-TFSI displayed much smaller contact angles than its $BF_4^-$ counterpart. This trend was observed over all measured cation types. Also noteworthy is that the addition of salt has a much smaller impact on the contact angle of $BF_4^-$ based mixtures than on the $TFSI^-$ mixtures.

Figure 8:
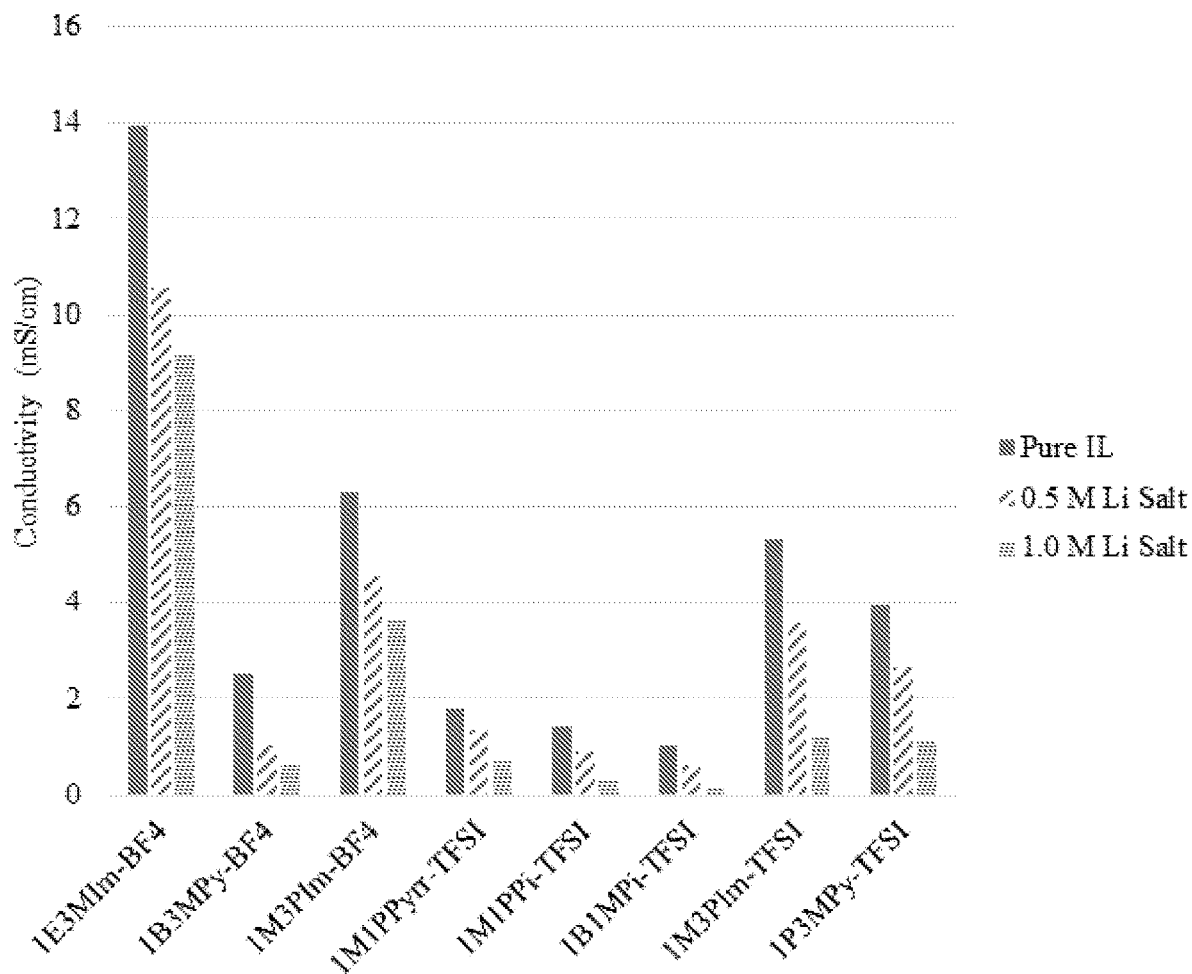
FIG. 8 is a bar chart showing the conductivity of a) pure ILs, and ILs with b) 0.5 M and c) 1.0 M added lithium salt.

As lithium salt is added to the neat ILs, conductivity is reduced with the 1.0 M salt showing a larger decrease in conductivity than with the 0.5 M salt concentration. FIG. 8 shows the conductivity of a) pure ILs, and ILs with b) 0.5 M and c) 1.0 M added lithium salt. For each IL, the left column indicates the pure IL, the middle column represents 0.5 M lithium salt, and the right column shows 1.0 M lithium salt. Notably, samples with $BF_4^-$ generally showed higher conductivity than the samples with $TFSI^-$ anions. With addition of lithium salt, conductivity is more significantly reduced for the $TFSI^-$ ILs than the $BF_4^-$-based samples. For example, the conductivity of 1E3MIm-$BF_4$ decreases from 14 mS to 9 mS (about 36% loss in conductivity), while the conductivity of 1B1MPi-TFSI decreases from 0.95 mS, to 0.125 mS (about 87% loss in conductivity) when comparing salt concentrations of 0 M and 1 M.

Example 4 Ionic Liquid, Carbonate Solvents, and Lithium Salts

Figure 9:
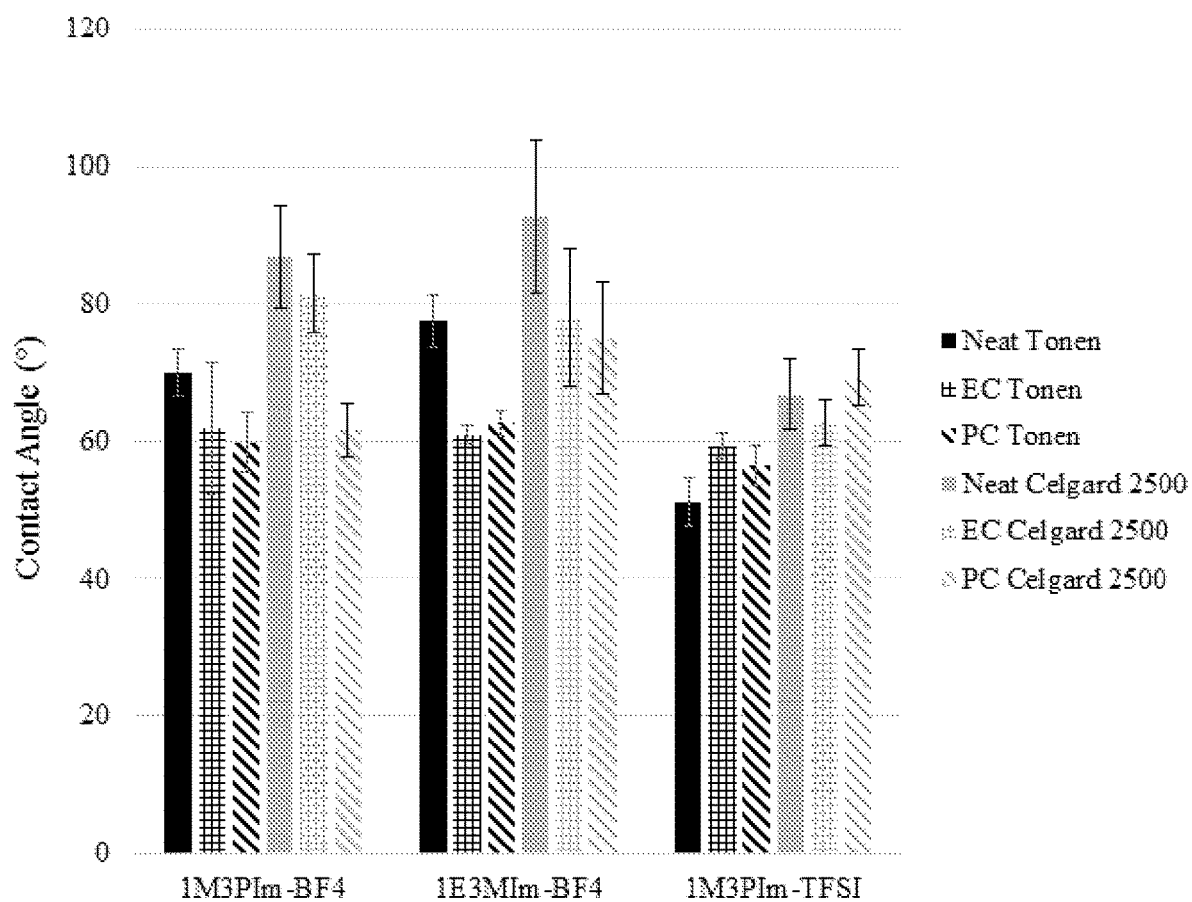
FIG. 9 is a bar chart showing contact angles for electrolytes consisting of 50% by volume ionic liquid (1M3PIm-BF$_4$, 1E3MIm-BF$_4$, or 1M3PIm-TFSI), 50% by volume carbonate (EC or PC), and 0.5 M lithium salt (LiBF$_4$ or LiTFSI). Neat ionic liquid with no carbonate and no lithium salt is also plotted for reference.

To complete the full analysis of the effects of adding carbonate solvents and lithium salts, electrolytes with ILs, carbonates, and lithium salts were also investigated. FIG. 9 shows the contact angle measurements for 50% by volume of ILs (1M3PIm-$BF_4$, 1E3MIm-$BF_4$ and 1M3PIm-TFSI) blended with 50% by volume of either EC or PC and 0.5 M lithium salt with the corresponding anion $BF_4^-$ or $TFSI^-$. Neat IL with no carbonate and no lithium salt is also plotted for reference. Error bars represent one standard deviation of 10 measurements for each IL-and-separator combination. The contact angles were significantly smaller for Tonen compared to Celgard 2500 which agrees with the results in FIGS. 5A and 5B. This suggests that Tonen has a better wettability with these types of electrolytes as well. In general, electrolytes with PC solvent produced contact angles smaller than or similar to those mixed with EC. For all combinations except 0.5 M LiTFSI in 1M3PIm-TFSI with PC, the mixtures of IL, carbonate, and salt produced smaller contact angles and showed better wettability than the neat ILs. These 12 combinations of IL, carbonate, and lithium salt were chosen for electrochemical testing in coin cells.

Example 5 Electrochemical Performance

Electrochemical performance assessment of the IL hybrid electrolytes was conducted using lithium iron phosphate ($LiFePO_4$) cathodes versus lithium metal anodes. In order to probe the behavior of the lithium salt anion, a control group of cells containing lithium salts based on $TFSI^-$, $BF_4^-$ or $PF_6^-$ anions dissolved in carbonate solvents (EC/DMC) with Celgard 2500 separator was prepared and tested. All of the cells from this control group delivered ~140 mAh/g of active cathode material. Cells using the hybrid electrolytes were assembled to explore the variables of separator (Tonen E24 versus Celgard 2500), anion ($BF_4^-$ versus $TFSI^-$), organic solvent additive (EC versus PC), and substituent length (ethyl-versus propyl-) using imidazolium-based ILs. These variables cover a range of conductivities and contact angles for the separators and electrolyte combinations.

Figure 10:
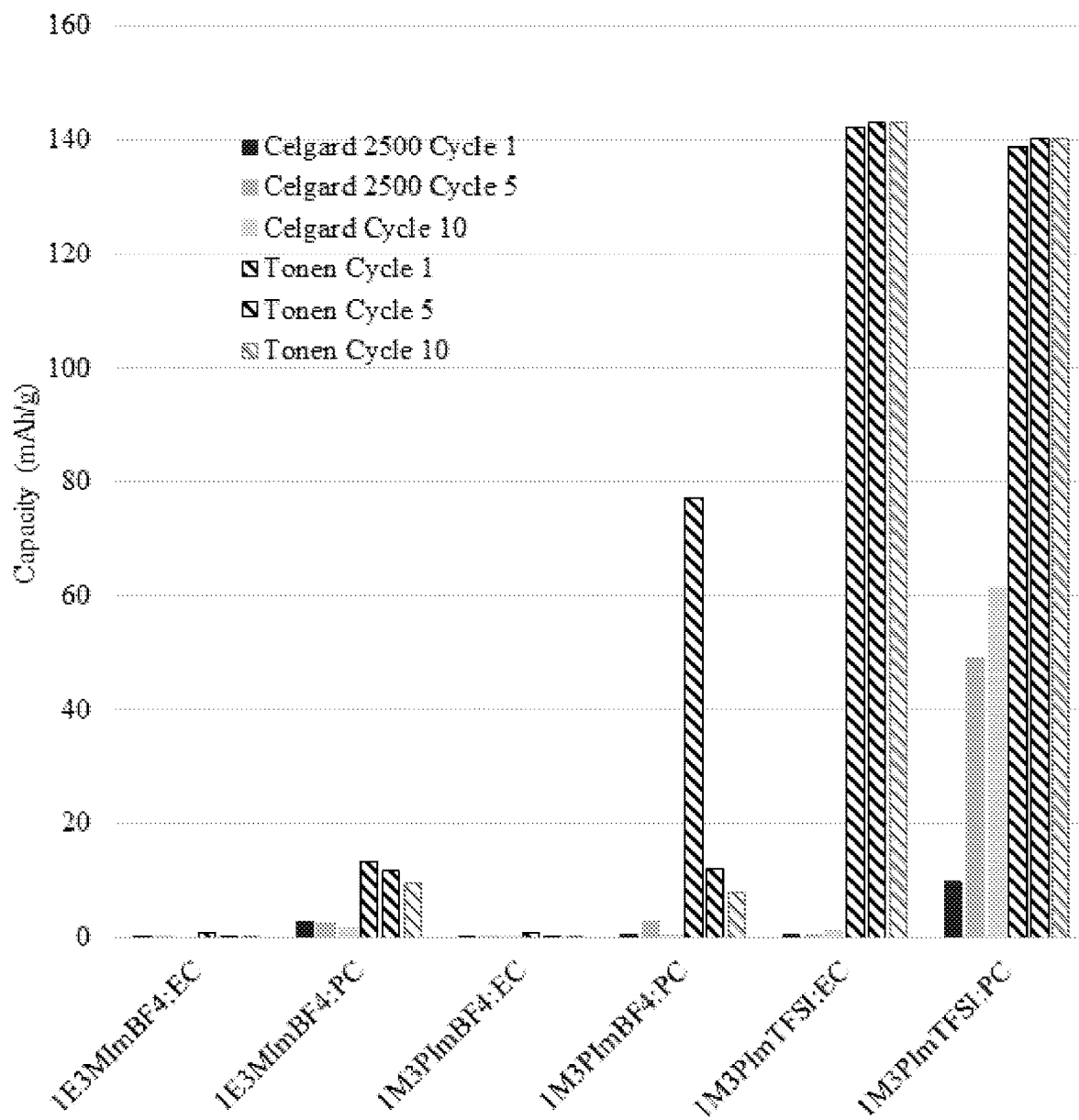
FIG. 10 is a bar chart showing the discharge capacities of the 1st, 5th, and 10th cycles for cells with LiFePO$_4$ cathodes, lithium metal anodes, and ionic liquid hybrid electrolytes with 0.5 M lithium salt
Figure 11:
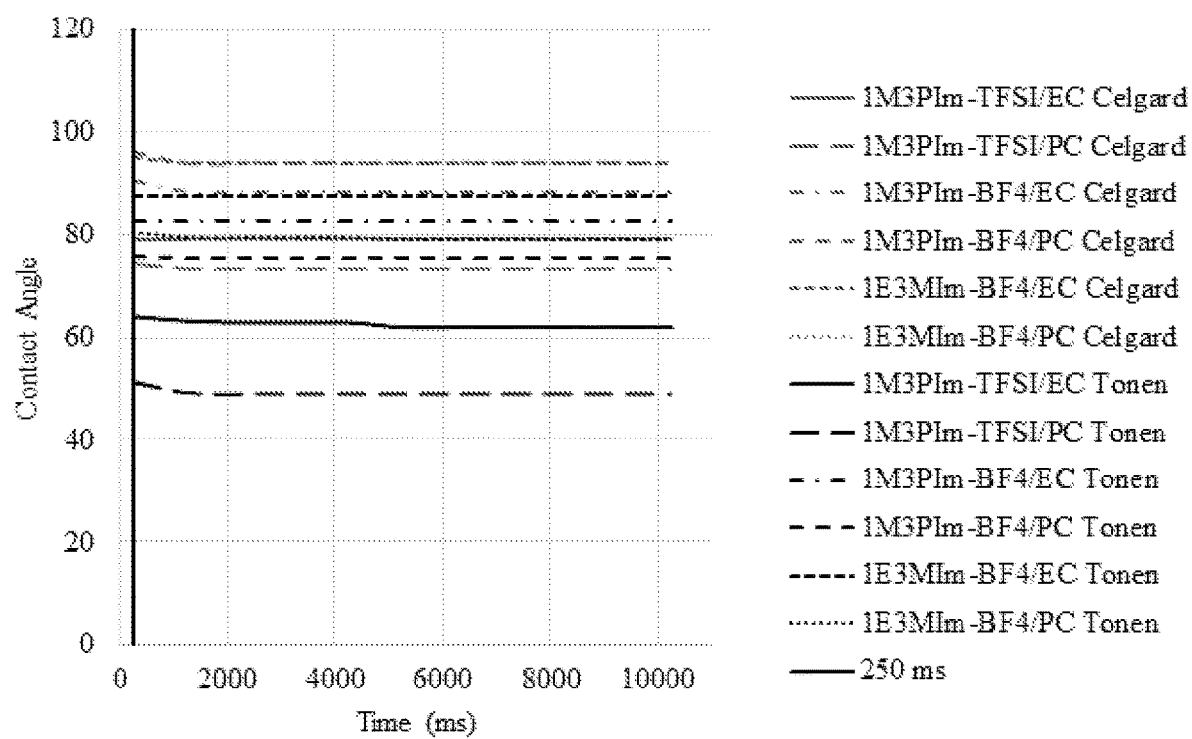
FIG. 11 is a graph showing the evolution of the contact angle over time of several IL mixtures on two substrates.

The performance of the cells under cycle testing was observed to cluster into two groups: 1) cells that showed good performance delivering ~140 mAh/g of active cathode material and 2) those that functioned very poorly typically delivering <10 mAh/g of active cathode material, as seen in FIG. 10. Anion type influenced cell performance significantly: the cells based in $BF_4^-$ electrolyte consistently delivered low capacities. Independent of solvent type, separator type, or substituent type, the cells with $BF_4^-$ anion delivered <10 mAh/g of cathode material by cycle 10. However, in the $TFSI^-$-based cell group, the cells assembled using Tonen E25 separator performed well, while the cells assembled using Celgard 2500 separator showed first cycle capacities of ≤10 mAh/g. One cell with 0.5 M LiTFSI in 1M3PImTFSI:PC electrolyte delivered 10 mAh/g on cycle 1 and 61 mAh/g on cycle 10, consistent with gradual wetting of the separator during use of the cell. (See FIG. 11.) Notably, there was no strong correlation with solvent type, PC or EC, or imidazolium cation substituent. The results demonstrate a strong interaction between separator type and anion type where cells with the combination of Tonen E25 separator and $TFSI^-$-based electrolyte performed well while the cells utilizing $BF_4^-$ salt or Celgard 2500 separator overall performed poorly. These data are summarized in Tables 2 and 3.

TABLE 2

Evolution of Contact Angle (°) over Time for IL-carbonate Mixtures on Celgard 2500.

| | Celgard 2500 | | | | | |
|---|---|---|---|---|---|---|
| Carbonate t(ms) | EC 1M3PIm-TFSI | PC 1M3PIm-TFSI | EC 1M3PIm-BF4 | PC 1M3PIm-BF4 | EC IE3MIm-BF4 | PC IE3MIm-BF4 |
| 250 | 79° | 74.4° | 90.5° | 96° | 95° | 87.5° |
| 1250 | 79.1° | 73.2° | 88.1° | 94° | 94.1° | 87.5° |
| 2250 | 79.1° | 73.2° | 88.1° | 94° | 94.1° | 87.5° |
| 3250 | 79.1° | 73.2° | 88.1° | 94° | 94.1° | 87.5° |
| 4250 | 79.1° | 73.2° | 88.1° | 94° | 94.1° | 87.5° |
| 5250 | 79.1° | 73.2° | 88.1° | 94° | 94.1° | 87.5° |
| 6250 | 79.1° | 73.2° | 88.1° | 94° | 94.1° | 87.5° |
| 7250 | 79.1° | 73.2° | 88.1° | 94° | 94.1° | 87.5° |
| 8250 | 79.1° | 73.2° | 88.1° | 94° | 94.1° | 87.5° |
| 9250 | 79.1° | 73.2° | 88.1° | 94° | 94.1° | 87.5° |
| 10250 | 79.1° | 73.2° | 88.1° | 94° | 94.1° | 87.5° |

TABLE 3

Evolution of Contact Angle (°) over Time for IL-carbonate Mixtures on Tonen.

| | Tonen | | | | | |
|---|---|---|---|---|---|---|
| Carbonate t(ms) | EC 1M3PIm-TFSI | PC 1M3PIm-TFSI | EC 1M3PIm-BF4 | PC 1M3PIm-BF4 | EC IE3MIm-BF4 | PC IE3MIm-BF4 |
| 250 | 64° | 51.3° | 82.7° | 75.8° | 87.4° | 80.4° |
| 1250 | 63.1° | 49.2° | 82.7° | 75.4° | 87.4° | 79.5° |
| 2250 | 62.8° | 49° | 82.7° | 75.4° | 87.4° | 79.5° |
| 3250 | 62.8° | 49° | 82.7° | 75.4° | 87.4° | 79.5° |
| 4250 | 62.8° | 49° | 82.7° | 75.4° | 87.4° | 79.5° |
| 5250 | 61.9° | 49° | 82.7° | 75.4° | 87.4° | 79.2° |
| 6250 | 61.9° | 49° | 82.7° | 75.4° | 87.4° | 79.2° |
| 7250 | 61.9° | 49° | 82.7° | 75.4° | 87.4° | 79.2° |
| 8250 | 61.9° | 49° | 82.7° | 75.4° | 87.4° | 79.2° |
| 9250 | 61.9° | 49° | 82.7° | 75.4° | 87.4° | 79.2° |
| 10250 | 61.9° | 49° | 82.7° | 75.4° | 87.4° | 79.2° |

The observed cell performance is consistent with the contact angle results obtained for the IL-based solutions where Tonen E25 separator showed lower contact angles than Celgard separators 2325 and 2500 (FIGS. 5A, 5B, 7, and 9). Further, TFSI-based ILs showed lower contact angles and improved wetting compared to $BF_4^-$-based liquids, also consistent with the performance characteristics of the cells. Notably, the $BF_4^-$-based ILs with and without added lithium salt often show higher conductivity than the TFSI⁻ analogs (FIG. 7). However, they also consistently show higher contact angle with separator materials (FIGS. 5A, 5B, 7, and 9). The cell testing results highlight that the influence of contact angle and separator wetting may be a deterministic factor in cell performance. In the data from this study, the electrochemical cell performance correlates more strongly with contact angle than with conductivity.

The contact angles for neat ILs, ILs blended with carbonate solvents, ethylene carbonate or propylene carbonate, ILs with lithium salt, and IL-carbonate solvent blends with added lithium salt were determined on battery-relevant surfaces. The contact angles of the solutions on composite electrodes were generally low. However, significant differences in contact angles could be seen among the solutions studied when measured on separator surfaces. Generally, the contact angles observed on Tonen E25 (polyethylene) separators were lower than those observed on Celgard 2325 (polyethylene-polypropylene layered material) and Celgard 2500 (polypropylene).

The role of the substituent on the organic cation was explored. In this series, the property of longer length of the substituent (ethyl, propyl, butyl) aids in wetting the separator by adding to the hydrophobic nature of the IL, making it more compatible with the hydrophobic separator membrane.

Example 6 Role of the Anion of the Ionic Liquid

The role of the anion of the IL was investigated where imidazolium based ILs with tetrafluoroborate ($BF_4^-$) or bis(trifluoromethanesulfonyl) imide (TFSI⁻) anions were studied. The contact angles for the two anions for three different chain-length ILs all showed the trend for the imidazolium cation, that the ILs with the TFSI⁻ anions have lower contact angles than those with the $BF_4^-$ anions suggesting they are better able to wet separators when compared to $BF_4^-$. The anion size does significantly influence the hydrophobic nature of the IL, with larger ions showing increased hydrophobic properties which, in this case, led to improved separator wetting.

Example 7 Effects of Carbonate Solvents on Wettability

Figure 12:
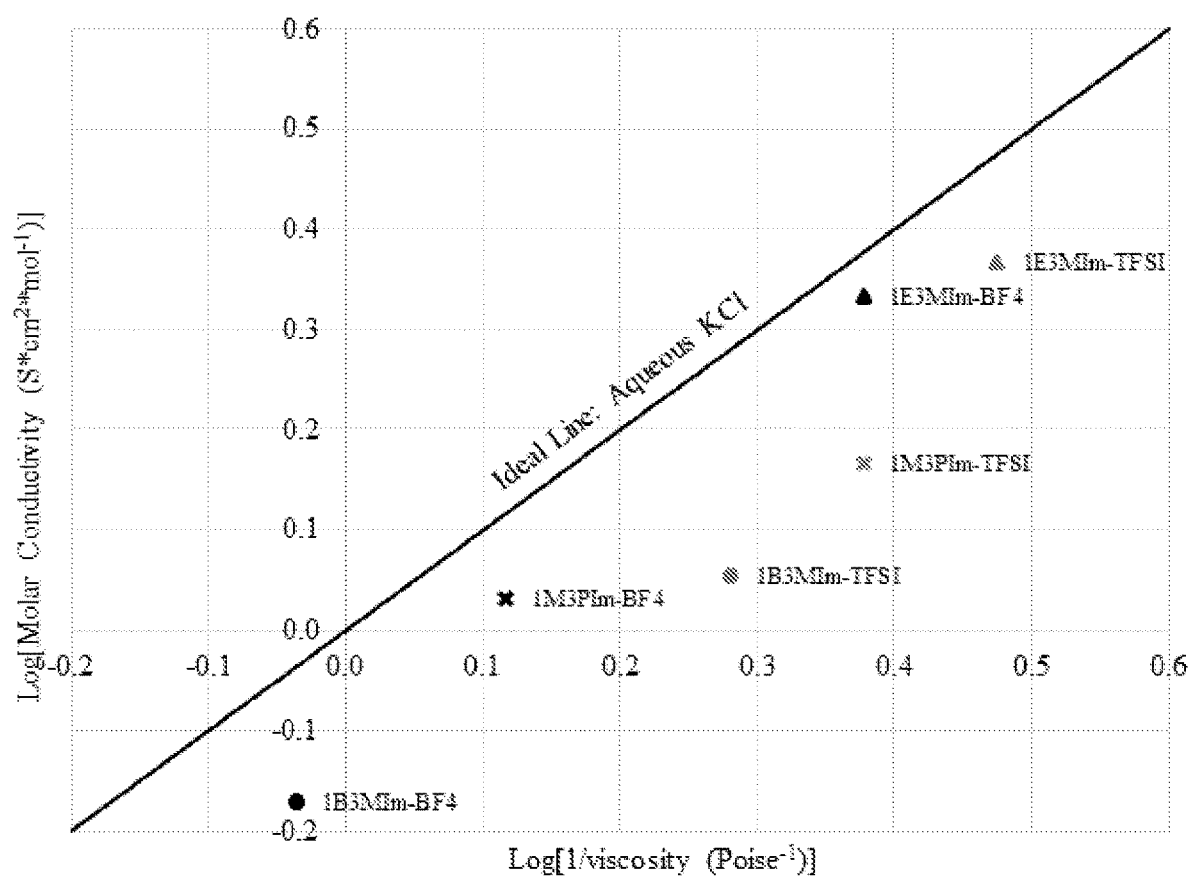
FIG. 12 is a plot of the molar conductivity vs. inverse viscosity for several ILs. (Note that both the x-axis and y-axis are logarithmic.)

The role of added carbonate-based solvents ethylene carbonate (EC) or propylene carbonate (PC) was explored. The addition of EC or PC to a $BF_4^-$ based IL may improve the wettability of a hydrophobic separator membrane, but the addition of PC or EC carbonate-based solvents to a TFSI⁻-based IL did not provide any further enhancement of wetting properties. This is consistent with the higher ordering of the BF$_4^-$-based ILs as reflected by the viscosity values where the viscosity of BF$_4^-$-based imidazolium ILs is higher than that of TFSI⁻-based imidazolium ILs. The correlation between the molar conductivity and the viscosity is shown in FIG. 12 for selected ILs. Those with BF$_4^-$ anions lie closer to the ideal line defined by the simple salt KCl in water, however all of the ILs show lower molar conductivity with decreasing viscosity than the ideal line. Note that both axes on this chart are logarithmic. The contact angles of the IL blends with the carbonate solvents typically either did not change or increased on the order of 5° with the addition of 0.5 M or 1 M salt.

Example 8 Combined Effects of IL, Solvent, and Salt

The full combination of IL, solvents ethylene carbonate (EC) or propylene carbonate (PC), and lithium salts tetrafluoroborate (BF$_4^-$) or lithium bis(trifluoromethanesulfonyl)imide (TFSI⁻) was explored on the surfaces of Tonen E25 and Celgard 2500. The Tonen separator showed significantly smaller contact angles and better wettability than Celgard 2500. Hybrid IL-based electrolytes prepared by addition of carbonate solvent and lithium salt generally showed lower contact angles than the corresponding neat ILs.

Material compatibility and cell electrochemistry involving the IL-hybrid electrolytes was tested in lithium-based coin cells utilizing LiFePO$_4$ cathodes. Anion type influenced cell performance significantly. None of the cells based on BF$_4^-$ hybrid electrolyte performed well, uniformly delivering low capacities. However, some of the cells containing electrolytes based on TFSI⁻-type ILs delivered capacities of ~140 mAh/g consistent with the lower contact angles and improved wetting compared to BF$_4^-$-based electrolytes. The results demonstrate a strong interaction between separator type and the IL anion type where the combination of Tonen E25 separator and TFSI⁻-based hybrid IL-electrolyte provided the best performance of the groups tested.

All publications and patents mentioned in the above specification are incorporated by reference in this specification in their entireties.

While the above is a description of what are presently believed to be the preferred embodiments of the invention, various alternatives, modifications, and equivalents may be used. Various modifications and variations of the described materials and methods will be apparent to those skilled in the art without departing from the scope and spirit of the invention. Although the disclosure has been described in connection with specific preferred embodiments, it should be understood that the invention as claimed should not be unduly limited to such specific embodiments. Indeed, those skilled in the art will recognize, or be able to ascertain using the teaching herein and no more than routine experimentation, many equivalents to the specific embodiments of the invention described herein. Such equivalents are intended to be encompassed by the following claims. Those skilled in the art will realize that other embodiments can be made without departing from the spirit of the invention, and it is intended to include all such further modifications and changes as come within the true scope of the following claims. Therefore, the above description should not be taken as limiting the scope of the invention, which is defined solely by the claims.

We claim:

1. An electrolytic composition comprising an ionic liquid, one or more solvents, wherein at least one of the one or more solvents is propylene glycol dimethyl ether.

2. The electrolytic composition of claim 1, wherein the electrolytic composition is a single phase solution.

3. The electrolytic composition of claim 1, wherein a cationic component of the ionic liquid is piperidinium-based, pyrrolidinium-based, imidazolium-based, or pyridinium-based.

4. The electrolytic composition of claim 1, wherein an anionic component of the ionic liquid is bis(trifluoromethylsulfonyl)imide.

5. The electrolytic composition of claim 1, wherein the ionic liquid is selected from the group consisting of 1-ethyl-3-methylimidazoliumbis(trifluoromethylsulfonyl)imide, 1-methyl-3-propylimidazoliumbis(trifluoromethylsulfonyl)imide, 1-butyl-3-methylimidazoliumbis(trifluoromethylsulfonyl)imide, 1-ethyl-3-methylimidazoliumtefluoroborate, 1-methyl-3-propylimidazoliumtetrafluoroborate, 1-butyl-3-methylimidazoliumtetrafluoroborate, 1-ethyl-3-methylpyridiniumbis(trifluoromethylsulfonyl)imide, i-propyl-3-methylpyridiniumbis(trifluoromethylsulfonyl)imide, 1-butyl-3-methylpyridiniumbis(trifluoromethylsulfonyl)imide, 1-butyl-3-methylpyridiniumtetrafluoroborate, 1-methyl-1-propylpiperidinium-bis(trifluoromethylsulfonyl)imide, 1-butyl-1-methylpiperidinium-bis(trifluoromethylsulfonyl)imide, 1-ethyl-1-methylpyrrolidinium-tetrafluoroborate, 1-methyl-1-propylpyrrolidinium-tetrafluoroborate, 1-butyl-1-methylpyrrolidinium-tetrafluoroborate, 1-ethyl-1-methylpyrrolidinium-bis(trifluoromethylsulfonyl)imide, 1-methyl-1-propylpyrrolidinium-bis(trifluoromethylsulfonyl)imide, and 1-butyl-1-methylpyrrolidinium-bis(trifluoromethylsulfonyl)imide.

6. The electrolytic composition of claim 1, wherein the ratio of the solvent to ionic liquid is from about 40%:60% to about 80%:20% by volume.

7. The electrolytic composition of claim 1, wherein the salt is a magnesium salt.

8. The electrolytic composition of claim 7, wherein the salt is selected from the group consisting of magnesium bis(trifluoromethylsulfonyl)imide, magnesium bis(fluorosulfonyl)imide, and magnesium perchlorate.

9. The electrolytic composition of claim 1, wherein at least one of the solvents exhibits a dissociation energy for Group 2 cations less than 600 kJ/mol.

10. The electrolytic composition of claim 1, wherein the electrolytic composition exhibits a viscosity of 40 mPas to 165 mPas.

11. The electrolytic composition of claim 1, wherein the salt is chosen from the group consisting of a magnesium bis(fluorosulfonyl)imide salt and a magnesium perchlorate salt.

12. The electrolytic composition of claim 11, wherein the salt is a magnesium bis(fluorosulfonyl)imide salt.

13. The electrolytic composition of claim 11, wherein the salt is a magnesium perchlorate salt.

14. The electrolytic composition of claim 1, wherein the ionic liquid and the solvent form a blend, wherein the blend is an electrolyte.

15. An electrochemical storage device comprising the electrolyte of claim 14, an anode and a cathode.

16. The electrochemical storage device of claim 15, wherein the anode comprises magnesium.

17. The electrochemical storage device of claim 16, wherein the magnesium is in the form of a magnesium alloy or magnesium intermetallic.

18. The electrochemical storage device of claim 16, wherein the magnesium is in the form of magnesium metal.

19. The electrochemical storage device of claim 15, wherein the cathode comprises a metal sulfide.

20. The electrochemical storage device of claim 15, further comprising: a separator film, the separator film positioned in between the anode and the cathode; and wherein the electrolyte exhibits a contact angle on the separator film of less than 100°.

21. The electrochemical storage device of claim 20, wherein the electrolyte exhibits a contact angle on the separator film of less than 54°.

22. The electrochemical storage device of claim 20, wherein the separator film comprises polyethylene.

23. The electrochemical storage device of claim 20, wherein the separator film comprises polypropylene.

24. An electrolytic composition comprising an ionic liquid, one or more solvents and a Group 2 salt, wherein one of the one or more solvents is propylene glycol dimethyl ether.

25. The electrolytic composition of claim 24, wherein a cationic component of the ionic liquid is piperidinium-based, pyrrolidinium-based, imidazolium-based, or pyridinium-based.

26. The electrolytic composition of claim 24, wherein an anionic component of the ionic liquid is bis(trifluoromethylsulfonyl)imide.

27. The electrolytic composition of claim 24, wherein the ionic liquid is selected from the group consisting of 1-ethyl-3-methylimidazoliumbis(trifluoromethylsulfonyl)imide, 1-methyl-3-propylimidazoliumbis(trifluoromethylsulfonyl)imide, 1-butyl-3-methylimidazoliumbis(trifluoromethylsulfonyl)imide, 1-ethyl-3-methylimidazoliurntetrafluoroborate, 1-methyl-3-propylimidazoliumtetrafluoroborate, 1-butyl-3-methylimidazoliumtetrafluoroborate, 1-ethyl-3-methylpyridiniumbis(trifluoromethylsulfonyl)imide, 1-propyl-3-methylpyridiniumbis(trifluoromethylsulfonyl)imide, 1-butyl-3-methylpyridiniumbis(trifluoromethylsulfonyl)imide, 1-butyl-3-methylpyridiniumtetrafluoroborate, 1-methyl-1-propylpiperidinium-bis(trifluoromethylsulfonyl)imide, 1-butyl-1-methylpiperidinium-bis(trifluoromethylsulfonyl)imide, 1-ethyl-1-methylpyrrolidinium-tetrafluoroborate, 1-methyl-1-propylpyrrolidinium-tetrafluoroborate, 1-butyl-1-methylpyrrolidinium-tetrafluoroborate, 1-ethyl-1-methylpyrrolidinium-bis(trifluoromethylsulfonyl)imide, 1-methyl-1-propylpyrrolidinium-bis(trifluoromethylsulfonyl)imide, and 1-butyl-1-methylpyrrolidinium-bis(trifluoromethylsulfonyl)imide.

28. The electrolytic composition of claim 24, wherein the ratio of the solvent to ionic liquid is from about 40%:60% to about 80%:20% by volume.

29. The electrolytic composition of claim 24, wherein the salt is a magnesium salt.

30. The electrolytic composition of claim 29, wherein the salt is selected from the group consisting of magnesium bis(trifluoromethylsulfonyl)imide, magnesium bis(fluorosulfonyl)imide, and magnesium perchlorate.

31. The electrolytic composition of claim 24, wherein at least one of the solvents exhibits a dissociation energy for Group 2 cations less than 600 kJ/mol.

32. The electrolytic composition of claim 24, wherein the electrolytic composition exhibits a viscosity of 40 mPas to 165 mPas.

33. The electrolytic composition of claim 24, wherein the ionic liquid and the solvent form a blend, wherein the blend is an electrolyte.

34. An electrochemical storage device comprising the electrolyte of claim 33, an anode and a cathode.

35. The electrochemical storage device of claim 34, wherein the anode comprises magnesium.

36. The electrochemical storage device of claim 35, wherein the magnesium is in the form of magnesium metal.

37. The electrochemical storage device of claim 34, wherein the cathode comprises a metal sulfide.

38. The electrochemical storage device of claim 34, further comprising: a separator film, the separator film positioned in between the anode and the cathode; and wherein the electrolyte exhibits a contact angle on the separator film of less than 100°.

39. The electrochemical storage device of claim 38, wherein the electrolyte exhibits a contact angle on the separator film of less than 54°.

40. The electrochemical storage device of claim 38, wherein the separator film comprises polyethylene.

41. The electrochemical storage device of claim 38, wherein the separator film comprises polypropylene.

42. The electrolytic composition of claim 24, wherein the salt is chosen from the group consisting of a magnesium bis(fluorosulfonyl)imide salt and a magnesium perchlorate salt.

43. The electrolytic composition of claim 42, wherein the salt is a magnesium bis(fluorosulfonyl)imide salt.

* * * * *